(12) United States Patent
Skidmore et al.

(10) Patent No.: US 10,957,110 B2
(45) Date of Patent: Mar. 23, 2021

(54) SYSTEMS, DEVICES, AND METHODS FOR TRACING PATHS IN AUGMENTED REALITY

(71) Applicant: EDX Technologies, Inc., Austin, TX (US)

(72) Inventors: Roger Ray Skidmore, Austin, TX (US); Dragomir Rosson, Webster, TX (US)

(73) Assignee: EDX Technologies, Inc., Austin, TX (US)

( * ) Notice: Subject to any disclaimer, the term of this patent is extended or adjusted under 35 U.S.C. 154(b) by 0 days.

(21) Appl. No.: 16/386,454

(22) Filed: Apr. 17, 2019

(65) Prior Publication Data

US 2019/0318544 A1  Oct. 17, 2019

Related U.S. Application Data

(60) Provisional application No. 62/658,904, filed on Apr. 17, 2018.

(51) Int. Cl.
*G06T 19/00* (2011.01)
*G01C 21/20* (2006.01)
*H04W 4/02* (2018.01)
*H04W 4/029* (2018.01)

(52) U.S. Cl.
CPC ............ *G06T 19/006* (2013.01); *G01C 21/20* (2013.01); *H04W 4/023* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2012/0280988 A1* | 11/2012 | Lampotang | G06T 19/20 345/419 |
| 2015/0161818 A1* | 6/2015 | Komenczi | H04N 13/25 348/43 |
| 2015/0187108 A1* | 7/2015 | Mullins | G06T 11/60 345/633 |
| 2017/0243400 A1 | 8/2017 | Skidmore | |
| 2018/0337994 A1* | 11/2018 | Dachille | H04L 67/1097 |
| 2019/0035124 A1* | 1/2019 | Kapinos | G06T 3/40 |

* cited by examiner

*Primary Examiner* — Steven Z Elbinger
(74) *Attorney, Agent, or Firm* — W&C IP

(57) ABSTRACT

Methods, devices, and systems are disclosed for providing augmented realities including trails or paths for navigating a real world space. Methods, devices, and systems are also disclosed for providing augmented realities for other forms of navigation guidance or tracking assistance.

15 Claims, 36 Drawing Sheets

SYSTEMS, DEVICES, AND METHODS FOR TRACING PATHS IN AUGMENTED REALITY

CROSS-REFERENCE TO RELATED APPLICATIONS

This application claims the benefit of U.S. Provisional Patent Application No. 62/658,904, filed Apr. 17, 2018, the complete contents of which are herein incorporated by reference.

FIELD OF THE INVENTION

The invention generally relates to augmented reality and, in particular, to forms of navigation guidance and tracking assistance using augmented reality representations.

BACKGROUND

Navigational tools have advanced considerably from days when paper maps were the only option for mobile persons to plan trips or draw routes taking into account a series of different locations. Portable electronic devices have grown into a mass consumer technology complete with "GPS" (Global Positioning System) technology. Single-purpose instruments for selecting road directions proliferated under brands like Garmin®. Multipurpose instruments like smartphones have since proliferated to provide consumers digital maps with driving direction features. Though multipurpose devices like smartphones may perform other tasks besides giving driving directions, the navigation applications of smartphones offer essentially the same features and user experience as single-purpose GPS navigation devices they've come to displace. Little has changed and improvements can feel marginal.

Between 2010 and 2020, virtual reality (VR) and augmented reality (AR) devices and technology rose substantially in use and availability among ordinary consumers and some businesses. However, in many instances such devices are limited to home use in contexts such as video game entertainment. VR and AR remain underdeveloped as meaningful navigation guidance and tracking assistances tools.

SUMMARY

A target such as a human or vehicle may travel through the real world, and a user of an exemplary system or device is provided an ability to track that target and receive visual AR content which portrays a path the target leaves behind.

At a high level, the AR portrayal of a target's movement may take the appearance of a trail of "breadcrumbs," an analogy to the familiar nursery story of children leaving a trail of breadcrumbs as a means for memorializing a path with some perpetuity. AR content of a breadcrumbs-type may entail the creation of specific augmentations which trace path or trails along which one or more targets previously traveled.

At a high level, the AR portrayal of a target's movement may take the appearance of a trail of fallen "dominos," an analogy to the familiar tile based game in which a path of dominos fall over among an initial playing table full of standing dominos. AR content of a dominos-type may entail showing many augmentations at the outset and removing augmentations to signify a target has visited location corresponding to those augmentations.

In both categories of embodiments—breadcrumbs-type and dominos-type—augmentations may be changed (e.g., altered in appearance) instead of being outright created from nonexistence or outright removed from existence.

A target's particular parameter that is tracked may differ among embodiments. For example, one or more of location, movement, speed, latitude, longitude, altitude, depth, and proximity may be tracked, among other parameters. Changes in one or more of such parameters may be tracked.

Proximity of a target to a particular real world location may be tracked such that the value of the proximity at multiple sample times is recorded in, by, or with a virtual object associated with the particular real world location. The proximity values thus stored may be then be retrieved at some substantially concomitant time or, alternatively, some future time for the purpose of changing augmentations of an AR output based on the changes in the stored proximity values. Proximity is often assessed between a mobile target an a stationary mobile reference location. However, other types of references (besides a reference location) may be used in some embodiments.

According to an aspect of some exemplary embodiments, methods, devices, or systems generate augmented reality (AR) output involving proximity-based creation, destruction, and/or modification of AR content. In some embodiments, the AR content is further affected by a target's view (e.g., viewing direction or frustum) at locations or over time. In some embodiments, the AR content is further affected by a user's view (e.g., viewing direction or frustum) at locations or over time.

By virtue of being created, removed, or otherwise changed, augmentations may have a temporary nature. According to an aspect of some exemplary embodiments, a specialized system for storage and retrieval of information is provided which facilities the creation, removal, and modification of either or both breadcrumbs-type and dominos-type augmentations. According to such an exemplary system, a virtual world may be provided which is modeled after the real world.

According to some exemplary embodiments, the storage of locations which collectively define a path or trail is performed using a 3D virtual model of a real world space. In this disclosure, the terms "virtual model" and "virtual world" may be used interchangeably. An exemplary 3D virtual model has virtual locations which are configured to correspond with real world locations. In other words, the 3D virtual model includes a virtual landscape modeled after the real world landscape. Real world geography, locations, landscapes, landmarks, structures, and the like, natural or man-made, may be reproduced within the virtual world in like sizes, proportions, relative positions, and arrangements as in the real world. For example, a 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location. Data stored by or with the virtual object is also inherently associated with the particular real world location. In some cases a single virtual object may be added as means for storing information for more than one location.

A virtual object stored in, with, or with reference to a virtual model may not inherently take a particular state as far as sensory modalities are concerned. For example, a virtual object may not have a particular appearance. Indeed, a virtual object may have no appearance at all, and in essence be "invisible" to an unaided human eye. By contrast, an augmentation is by definition perceptible according to one or more sensory modalities. That is, an augmentation may be seen, heard, touched, smelled, and/or tasted. An augmentation may be regarded as the "face" of a virtual object, in which case data stored in, by, or with the virtual object is used to determine what the augmentation portrays or signifies to a user looking upon that "face".

According to one aspect of some embodiments, AR content is included in an AR output at multiple locations which were at some point in time in close proximity to a tracked real world object like a person or mobile electronic device. Wherever the tracked object went over some time period of interest, locations proximal to the tracked object at various points in time may be marked in the AR output with some augmentation, e.g., a virtual sign post. Proximity information may be stored for portrayal in AR content at some future time, in which case the proximity information may be stored (e.g., with a timestamp) using a virtual object and retrieved from the virtual object at the time of AR production. As the proximity of a given location and the tracked object changes, e.g. the tracked object moves away, the augmentation may be modified in the AR output (and/or in the virtual object) based on the changing proximity. Virtual objects may be used to keep a record of proximity over time, e.g., with different proximity values each having a different timestamp.

As an illustrative example, augmentations such as virtual sign posts may be associated with real world locations. Conceptually this relationship between augmentations and real world locations may be analogized to mile markers on a highway, boundary pegs or boundary posts used by property surveyors, or signs marking street addresses. All such real objects designate a real world physical location at which they exist. In contrast to these real world sign posts, however, virtual posts presented to a user in an AR output may convey not just an identify of a location, but also signify that a tracked target was near or at the location identified by the sign post. In other worlds, while real world objects like mile markers are strictly location-based, virtual objects and their augmentations according to some exemplary embodiments may be both location-based and proximity-based. AR content may be added, removed, or otherwise modified at specific non-mobile real world locations in dependence on the proximity of a mobile real world object (a target) with respect to those non-mobile real world locations.

For example, a sign post augmentation may be displayed in AR output for every location a mobile device visits. As time elapses since the mobile device's last visit, the sign post augmentation may change appearance (e.g., fade or change color) to signify the passage of time since the mobile device's last visit. As another example, as the distance grows between the mobile device and the location of an augmentation, the augmentation may change (e.g., change size or shape) in dependence on the changing proximity distance.

The preceding sign post examples are breadcrumbs-type AR. By contrast, according to the dominos-type AR, AR content may be removed from an AR output at each location which is or has been in close proximity to a tracked real world object since some selected start date/time. In other words, some embodiments may involve producing AR content in which the presence of augmentations (or the presence of augmentations of first particular appearance and not some other second particular appearance) signifies that the location has not been visited by a tracked target. Loosely analogous is the classic arcade game, Pac-Man, by which virtual yellow dots are removed from locations which Pac-Man visits. In Pac-Man, the presence of a yellow dot signifies that the location has not been visited by Pac-Man. The absence of an augmentation in the AR content (or the use of alternative appearances to the augmentation) may signify that the location has in fact been visited by the tracked target within some preceding window of time. In Pac-Man, the absence of a yellow dot signifies that the location was already visited by Pac-Man. Other variations may exist in other embodiments.

According to an aspect of some exemplary embodiments, augmented realities are provided in which a user is supplied AR content containing virtual "breadcrumbs" which mark a path (i.e., trail) to follow in a real world view.

According to another aspect of some exemplary embodiments, augmented realities are provided in which a user is supplied AR content containing virtual "dominos" which differentiate real world physical locations which have been visited from real world physical locations which have not been visited.

According to another aspect of some exemplary embodiments, virtual trails are generated using virtual augmentations to a real world view, where the virtual trails are created in response to a tracked target (e.g., a mobile electronic device) moving through a physical landscape. As the device moves from a first location to a second location to a third location and so forth, virtual objects are added to or updated within a 3D virtual model of that real world landscape at virtual world locations matching the real world locations. In effect, the mobile electronic device drops "breadcrumbs" in the form of virtual objects along the route navigated by the mobile electronic device. The virtual objects are thereafter usable to generate augmentations which allow a user to visually retrace the path of the tracked target that left the "breadcrumbs".

Exemplary embodiments of the invention may involve a wide array of applications. AR trails of a breadcrumbs-type provided by exemplary methods and systems may provide guidance to hikers, bikers, skiers, and other outdoorsmen when they are lost or disoriented. AR trails may be provided for use by law enforcement personnel (e.g., police officers) when, for example, chasing a suspect or investigating (e.g., recreating) past events. Responding officers arriving at the initial scene of a crime may be provided with AR trails following an officer already in pursuit of a suspect. AR trails may be provided for replaying training scenarios. AR trails may be provided to mark a path to a particular target, destination, or other user.

AR trails of a dominos-type also have a variety of possible applications. For example, in the area of public safety, a dominos-type method and its AR output may easily highlight areas that have or have not been searched. As another example, in the area of wireless networks or surveying, the method and its AR output easily highlight areas that have or have not been measured. As yet another example, in a military context, the method and its AR output may assist in the clearing of minefields. Locations at which an initial AR augmentation has been removed and therefore which is no longer visible have been cleared, whereas locations at which AR augmentations are still visible remain to be unsafe.

Advantages of exemplary embodiments are multifold. Exemplary AR content may provide a relatively passive form of guidance that is neither intrusive or excessively distracting of a user's attention. For example, a simple path formed by visual cues or markers dotting a path of "breadcrumbs" provides a user simple and intuitive visual guidance without excessive distraction. Furthermore, in some embodiments, AR trails may easily display many markers within a user's viewing frustum without a risk of overwhelming, inundating, or confusing the user. A user may be provided with a readily understood visual basis for assessing not only the most immediate movement required but also movements in the future which may be in visual range.

DETAILED DESCRIPTION

Figure 1:
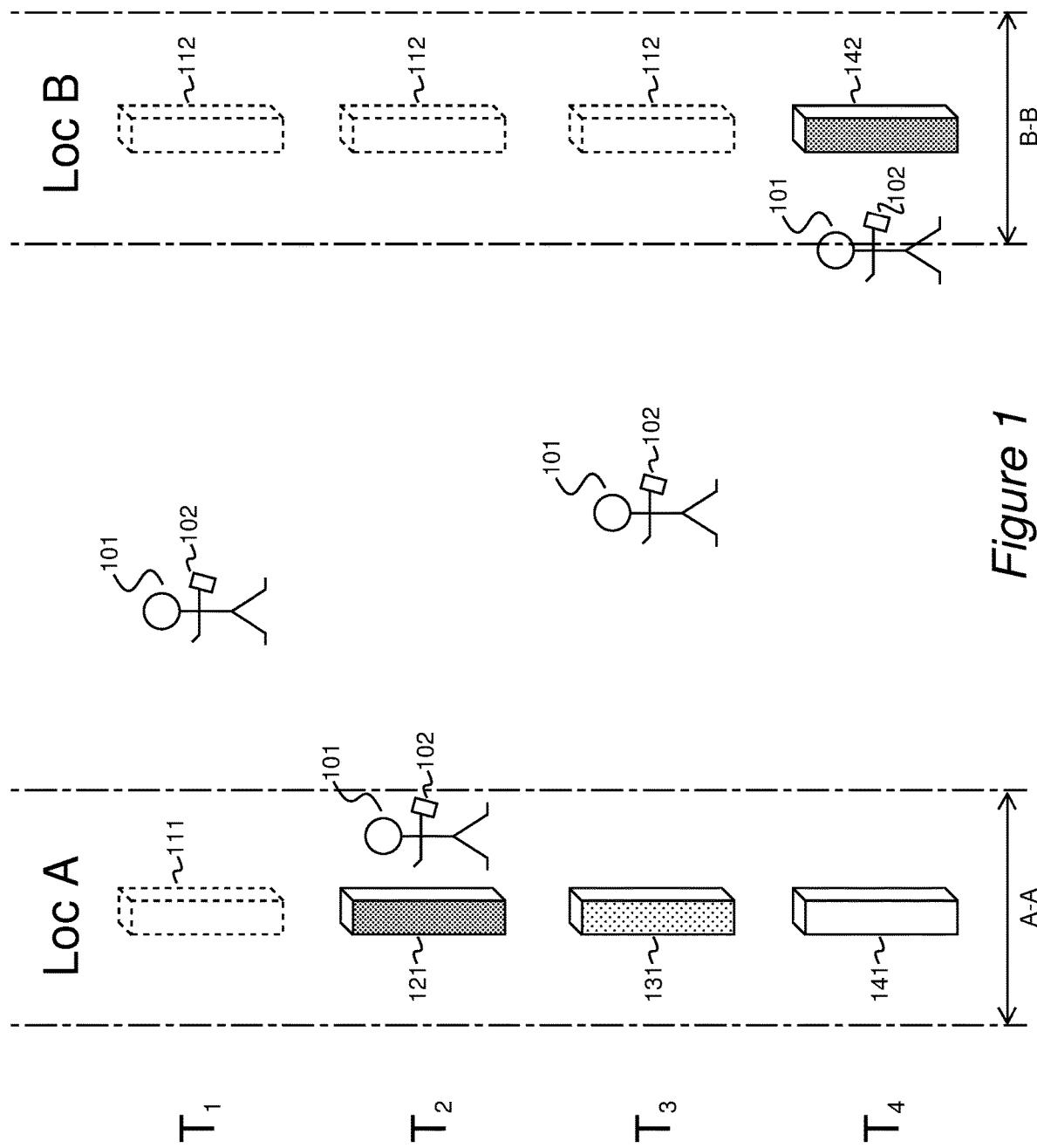
FIG. 1 is a schematic illustration of an embodiment for producing proximity-based AR content.

FIG. 1 schematically illustrates an exemplary embodiment that produces proximity-based AR content. In this example, a real world person 101 has a mobile electronic device 102 (e.g., a mobile phone, wearable, laptop, smartwatch, etc.). The person 101, the device 102, or some combination of the pair constitutes a real world target, and an exemplary method or system involves tracking the real world target as the target changes location in the real world. For simplicity and clarity of illustration in FIG. 1, locations and movement are confined to a unidimensional physical space (specifically a line, with possible directions of movement being left or right on the page). The person 101 and device 102 are mobile and move to different locations as time progresses. Time is represented in increments, with four instances of time illustrated, labeled respectively as $T_1$, $T_2$, $T_3$, and $T_4$. Two real world locations are also illustrated and labeled. They are identified as Loc A and Loc B, respectively. An exemplary system may comprise the mobile device 102 and processors (not shown in FIG. 1), among other support hardware, the combination of which is configured to track the proximity of the target (user 101 and/or device 102) with respect to one or more real world locations. The system is further configured to modify the AR content output from the system based on the target's proximity to real world locations. In particular, the system may change augmentations of an AR output based on one or more changes in the proximity of the tracked target to the real world locations, Loc A and Loc B. To affect the tracking and changing, the real world location under consideration (Loc A and Loc B) may each be associated with virtual objects which in turn may sometimes (but not at other times) be associated with respective augmentations.

For convenience of discussion, that with which the target is compared may be referred to as a reference. The target may be a person, an object, a location, or some other thing (typically but not necessarily tangible, and typically but not necessarily having recognizable boundaries). The reference may be a person, an object, a location, or some other thing (typically but not necessarily tangible, and typically but not necessarily having recognizable boundaries). A target may be a vehicle, a device such as a mobile electronic device (e.g., a mobile phone, wearable, laptop, smartwatch, etc.), an animal, a person of a particular type (e.g., a criminal suspect, a law enforcement officer, a soldier, a civilian, a child, etc.), a user, some other thing which may move from time to time, a plurality of any of these, and or a combination of any of these.

Proximity may be defined, characterized, or otherwise assessed in one or more of a variety of forms. At a high level, proximity entails how close together or how far apart two items are. Proximity may be a constant in the event a target and reference both maintain fixed positions within a common frame of reference. Proximity changes when either the target or the reference moves with respect to the other. For convenience of discussion, examples herein tend to describe proximity changes on the assumption that the reference is fixed (location is constant) and the target is mobile and has changed location at least once in some time window of interest. This is a non-limiting scenario used for exemplary illustration.

In FIG. 1, locations are defined according to a proximity range (e.g., A-A or B-B). In this example, proximity is characterized as a binary: either the target is "at" the reference, or the target is "away from" the reference. Locations Loc A and Loc B are references, device 102 is a target, and ranges A-A and B-B are elements which facilitate characterizing the proximities among the references and target. The device 102 may be at Loc A by falling within the distance range A-A, and the device 102 may be at Loc B by falling within the distance range B-B. Conversely, if the device is outside a range A-A or B-B, the target is away from the respective reference.

References (like reference locations Loc A and Loc B) are associated with virtual objects. Said differently, virtual objects are associated with the references. In FIG. 1, virtual object 111 is associated with real world location Loc A, and virtual object 112 is associated with real world location Loc B. An exemplary method of creating such associations is to instantiate or set such virtual objects as 111 and 112 within a virtual model (virtual world) which is configured to model the real world. Such virtual models create virtual spaces which resemble the real world. In particular, real world geography, locations, landscapes, landmarks, structures, and the like, natural or man-made, may be reproduced within the virtual world in like sizes, proportions, relative positions, and arrangements as in the real world. Within the virtual world, any number of virtual objects may be created (e.g., instantiated) at virtual locations. Since a virtual location corresponds with a real world location, a virtual object at a given virtual location becomes associated with a particular real world location that corresponds with the given virtual location. Data stored by or with the virtual object is also inherently associated with the particular real world location.

Storing information in virtual objects offers certain advantages. One advantage is the option of permanency. Central to many embodiments of the invention are changes which are made to augmentations to reflect changes in real world conditions, e.g., the movement of a real world target. As a result, augmentations may be temporary, even fleeting. Augmentations may come and go, and change so dramatically in appearance or by other sensory modality that information formerly portrayed by the augmentation is all but lost in an updated state of the augmentation. By contrast, virtual objects may persist where augmentations do not. In effect, virtual objects may provide a constant backbone for a variety of different and changing augmentations. Virtual objects may serve as data stores comprising a compilation of information for a respective real world location. An augmentation associated with a particular virtual object may be based upon just a fraction of the data maintained by the virtual object. That data which is not drawn upon may be preserved virtually, permitting it to remain available for a future change to the augmentation.

Virtual objects 111 and 112 have locations within the virtual model which match the real world locations with which the virtual objects are associated (here, Loc A and Loc B, respectively).

By definition virtual objects are entities of virtual reality and/or augmented reality which may or may not be "visible" or otherwise perceptible to a human (e.g., audible, tactile, etc.). At the time of writing this disclosure, the most common augmentations in AR content are visual and/or audial, and many of the illustrative examples will describe visual and/or audial augmentations. It should be understood, however, that additional or other sensory modalities may be employed in the practice of the invention (augmentations may be one or more of visual, audial, tactile, gustatory, and olfactoral). An "augmentation" is a sensory output of an AR or VR system by which a virtual object is expressed to a human. In the example of FIG. 1, virtual objects 111 and 112 are illustrated with broken lines for the benefit of a reader of this disclosure, but the person 101 does not perceive the existence of anything virtual at Loc A or Loc B at T1 because no augmentations exist at T1.

If the target (here, device 102 or, indirectly, person 101) comes within the proximity range of a location (Loc A or Loc B), an augmentation is created or modified as a result of the change in proximity. At time T1, however, device 102 is not at Loc A or Loc B. Accordingly, an AR output may not show any augmentation at Loc A or Loc B. Of course, augmentations which are unrelated to this method of tracking proximity of a target may still be displayed.

Between T1 and T2 person 101 and device 102 moved. As a result, at time T2, device 102 falls within range A-A and is therefore at Loc A. A system detects this new proximity state (the proximity state at T2) and, as a result, the AR output is modified. An augmentation 121 (here, what appears as a darkly shaded rectangular post) now appears in the AR output at Loc A. The change in the tracked target's proximity to Loc A between T1 and T2 results in the change of AR content for Loc A. Whereas no augmentation existed at T1, an augmentation 121 now exists at T2. The augmentation 121 is a perceptible output corresponding with the virtual and otherwise imperceptible virtual object 111.

Between T2 and T3 person 101 and device 102 move again. At time T3, the targets are neither at Loc A or at Loc B. The change in proximity to Loc A (e.g., the change from the user being proximal to Loc A at T2 to the user no longer being proximal to Loc A at T3) has been detected by the system. In response to this detected change, the system changes the AR output to modify the appearance of the augmentation 121 displayed at Loc A. Now the AR output shows augmentation 131 at Loc A. Augmentation 131 is a modification of augmentation 121 and, as apparent from FIG. 1, is shaded with a medium density shade instead of a high density shade. This change in the AR output, from augmentation 121 to augmentation 131, is an important feature of this exemplary embodiment. The change in AR output provides an indication (here, a visual indication) to a user that a change in proximity has occurred. In particular, the change from a dark shade augmentation 121 to a medium shade augmentation 131 is indicative that the target (device 102 or user 101) was at Loc A at some previously point in time but has since moved away from Loc A.

Between T3 and T4 person 101 and device 102 move again. As shown in FIG. 1, at time T4, the target (device 102 or user 101) is now within the range B-B and therefore determined to be at Loc B. This proximity change for Loc B is detected and triggers a modification to the AR content for Loc B. In particular, the system now displays an augmentation 142 at Loc B which indicates to a user that the proximity state of the target (user 101 or device 102) has changed with respect to a reference (Loc B). In this example, augmentation 142 matches augmentation 121 in appearance attributes (that is, both are darkly shaded posts) because this particular visual VR output is used in this example to indicate to a user that the target is at the location where the darkly shaded post appears. Augmentation 142 is associated with virtual object 112.

The preceding paragraph focused on the proximity change of the target with respect to reference, Loc B. Between T3 and T4 other proximity states are changing as well, with respect to other references. In this limited example, the other reference is Loc A. From FIG. 1 it is apparent that the VR output for Loc A has changed from a medium shade augmentation 131 to an augmentation 141 which has light shading or no shading at all. While it was stated above that this example involves only two possible proximity states— "at" or "away"—these states may have sub-states which provide additional information through the VR output. As an example, the augmentations may be used to indicate to a user the amount of time a target has been at or away from a reference. In a non-binary system (e.g., a system with three or more qualitative or quantitative states; a system in which proximity is defined metrically according to a measured distance between target and reference), the changes in augmentations may be used to indicate how far away or how close a target is to a reference.

In FIG. 1, the change in appearance of the augmentations at Loc A from T2, to T3, to T4 is a predetermined setting used to signify to a viewer of the AR content an amount of time that has elapsed since the target (user 101 or device 102) was at Loc A. As between the three times (T2, T3, and T4), a viewer of the AR content would be able to understand that at T2 the target was at Loc A, that at T3 the target was at Loc A a relatively short time ago (but no longer), and at T4 that the target was at Loc A a comparatively long time ago (but no longer). After a predetermined duration of time has elapsed in which the target has failed to return to Loc A, the augmentation at Loc A may be removed entirely (essentially resuming the same omission of any appearance as at T1). If the user were then to return to Loc A, the augmentation would once again be changed and a timer associated with the augmentation reset.

In FIG. 1, every reference location (Loc A and Loc B) is permanently associated with a virtual object (111 or 112). While the augmentation associated with the virtual objects were generated, changed, or removed, the virtual objects themselves continued to exist. This is but one possible approach to implementing a method of tracking proximity of a target. Other alternatives are possible. For instance, virtual objects may be created and removed concurrently with the creation or removal of their corresponding augmentations.

In FIG. 1, every reference location also has a one-to-one relationship with an augmentation. At any time (T1, T2, T3, or T4) each augmentation was associated with at most one virtual object. This is but one example configuration and others are of course possible. For instance, assuming a series of point locations serve as references, and each reference is associated with a virtual object, the collection of virtual objects may together correspond with one augmentation such as a continuous visual band or path that does not contain visual "breaks" from one location or virtual object to the next location or virtual object.

Figure 2A:
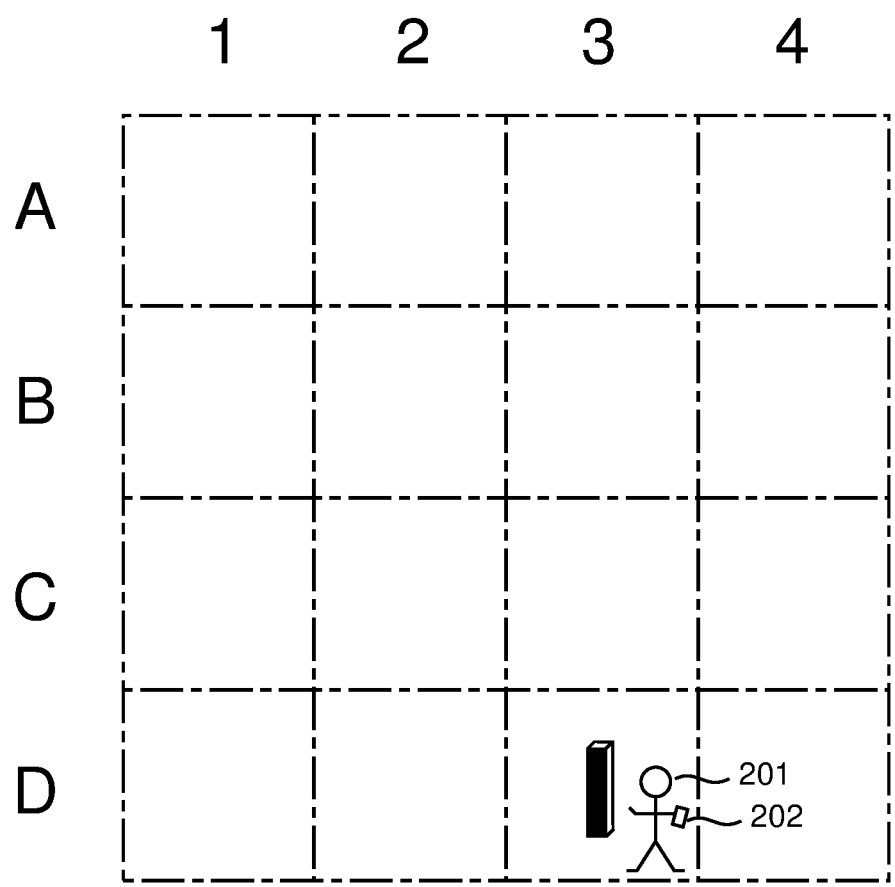
FIGS. 2A to 2F are schematic illustrations of an exemplary embodiment for producing proximity-based AR content of a breadcrumbs-type.
Figure 2B:
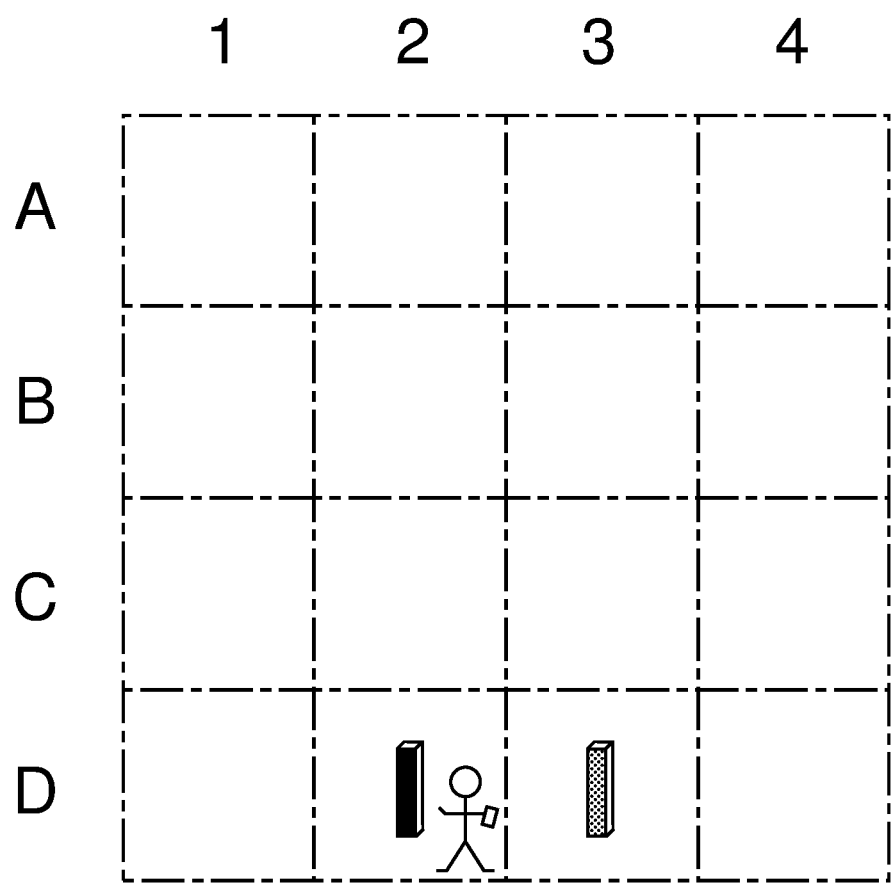
Figure 2C:
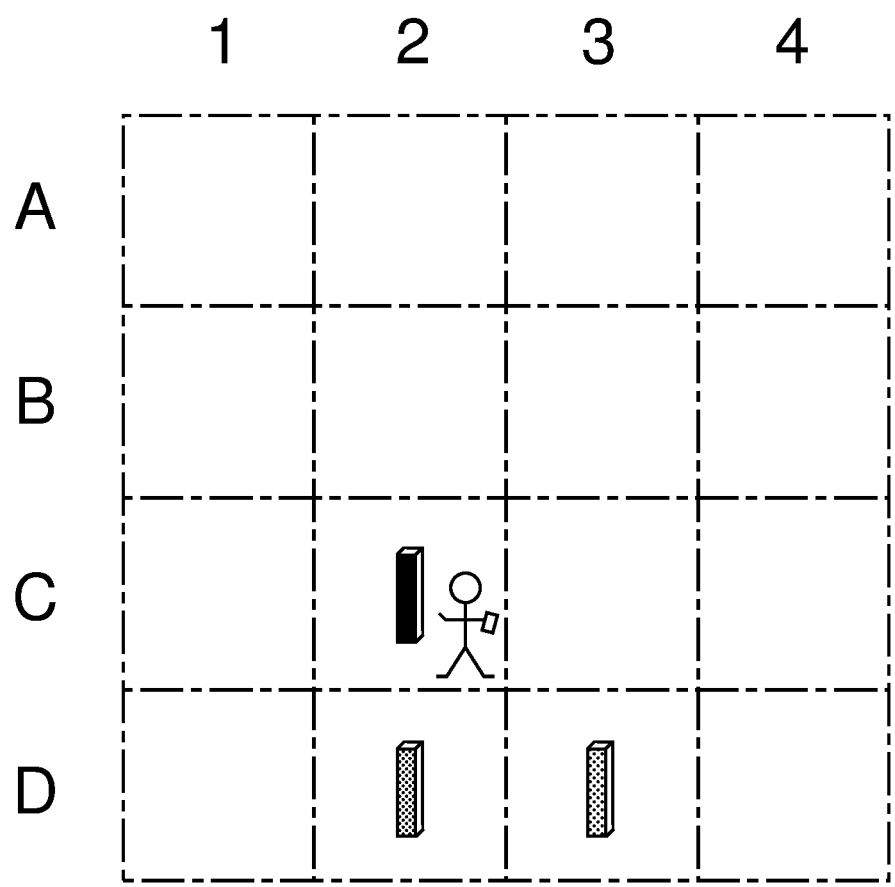
Figure 2D:
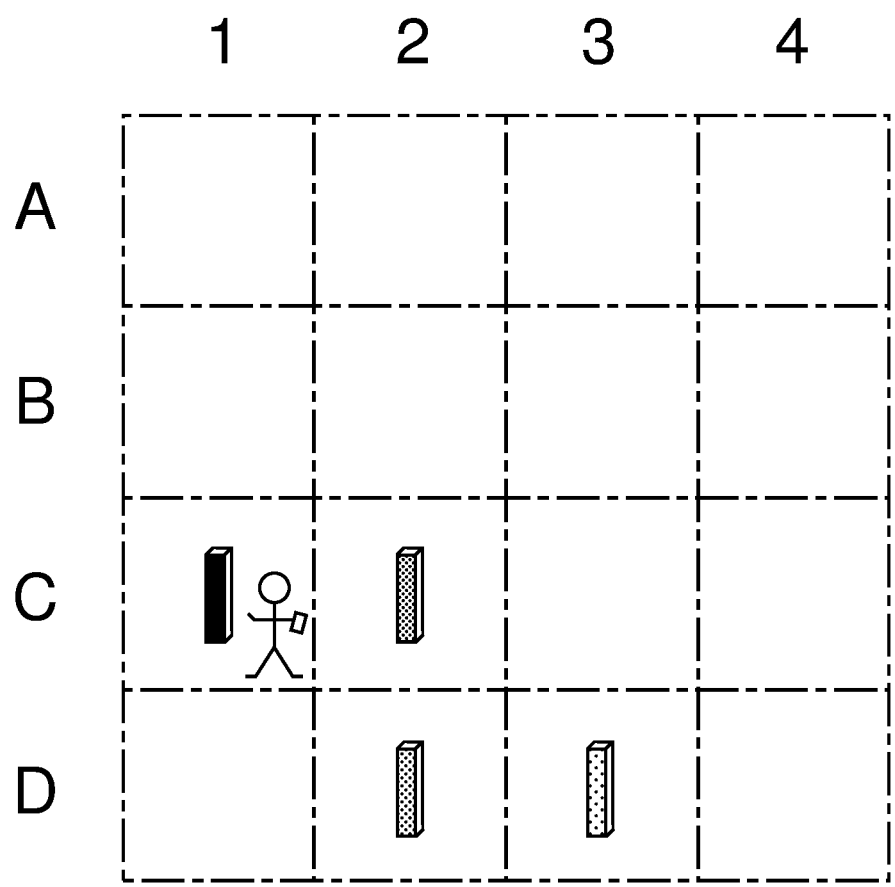
Figure 2E:
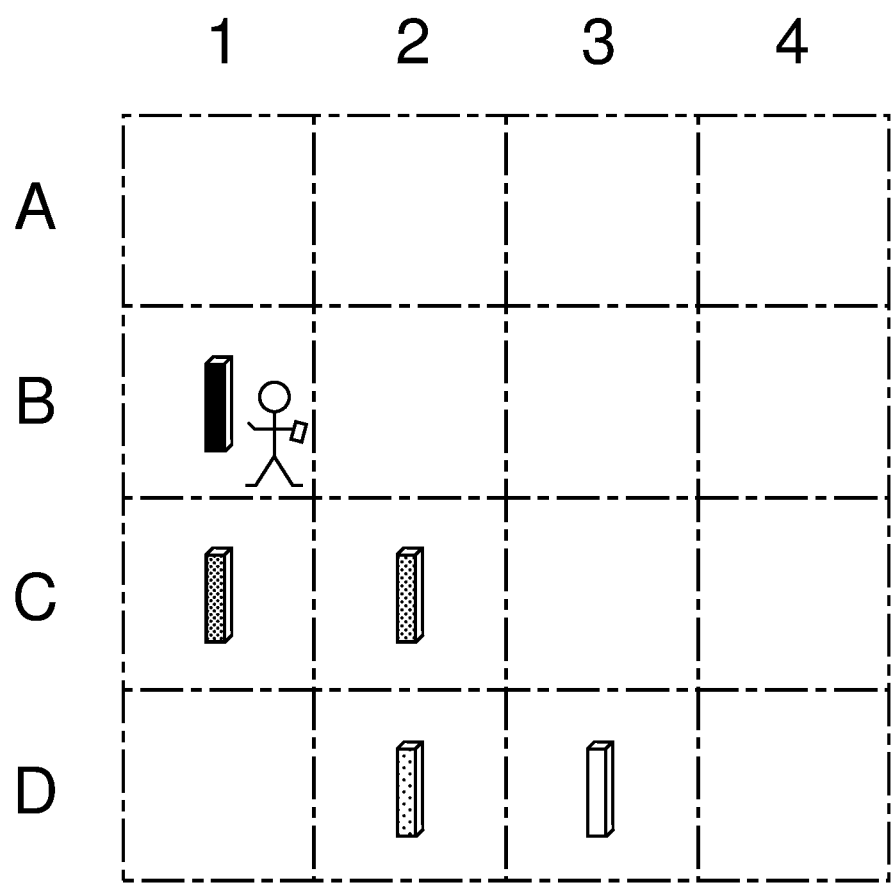
Figure 2F:
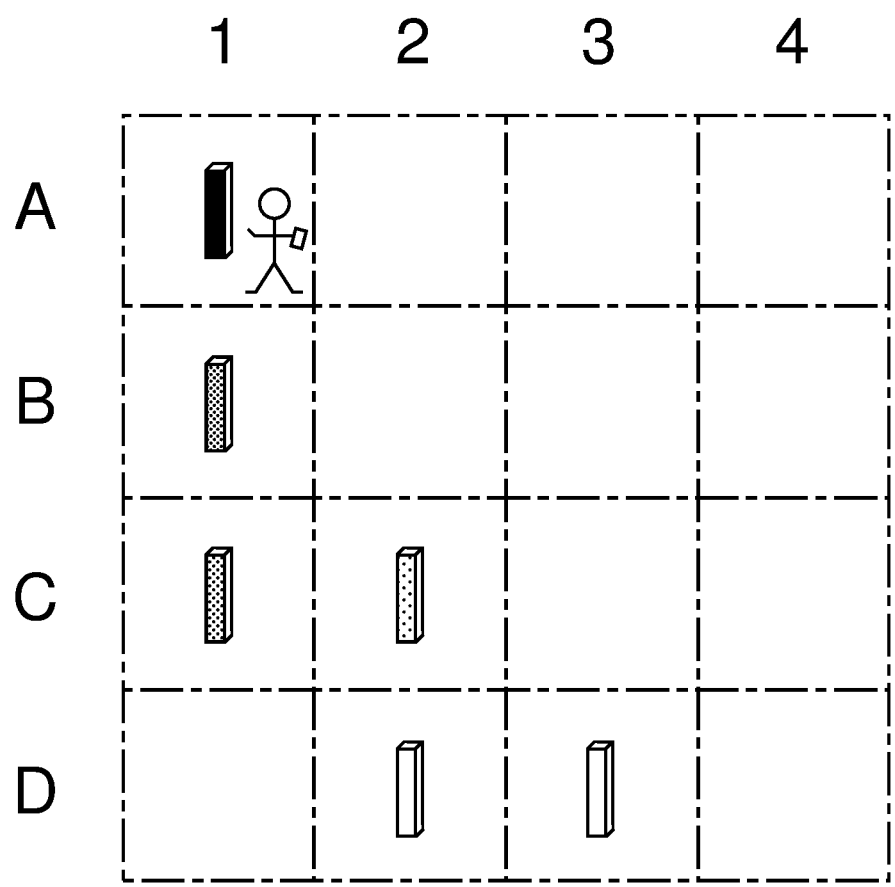

FIGS. 2A to 2F are illustrative of another exemplary method bearing many of the same qualities as the method illustrated by FIG. 1. Notably different, however, is that FIGS. 2A to 2F illustrate space in two-dimensions, and the system is configured such that the two-dimensional real world plane is divided into a plurality of locations of predetermined width and length. All the locations together constitute 100% of possible real world space in the two-dimensional plane. Whereas in FIG. 1 it was possible for the target to be at no reference location (e.g., the scenarios at times T1 and T3), in FIGS. 2A to 2F the target is at all times at one and only one reference location. All possible physical space has been attributed to one reference location or another. As illustrated, the system is configured to recognize sixteen reference locations (A1, A2, A3, A4, B1, B2, B3, B4, C1, C2, C3, C4, D1, D2, D3, and D4). Each figure from FIG. 2A to FIG. 2F represents an incremental change in time. Thus, FIG. 2A captures a start time, FIG. 2F captures an end time, and FIGS. 2B to 2C show changes in AR output occurring between the start time and end time.

In FIGS. 2A to 2F, an augmentation is created for each location the tracked target visits. Thus, by simple observation of which locations have a virtual post and which do not, the AR output identifies for a user which locations the target has visited and, conversely, which locations the target has not visited (during a particular window of time). Each augmentation (here, posts) functions as a virtual "breadcrumb" left behind by the target (here, person 201 or device 202), thereby tracking his path through the real world space (here, the real world space is characterized by the illustrated grid of sixteen blocks).

The path (or paths) involved in method 500 may be any real world path, such as along or through bridges, roads, and buildings, or such as across country through a field or woods. A tracked target (such as a flying vehicle like an airplane, or a person using on such a vehicle) may be capable of flight, and a tracked target (such as with a submersible vehicle like a submarine) may be capable of diving. In these among other cases paths may especially involve altitude or depth considerations. In the alternative to receiving locations from a known origin, the system may receive a plurality of locations the origin of which is not necessarily known and/or consequential. In any case, the plurality of locations may describe a path used or useable to physically traverse a real world landscape. For instance, the locations may each be a fixed number of meters apart (1 meter, 10 meters, 20 meters, etc.) from an adjacent location in the same set and collectively trace out a path from a starting location to a destination location.

A target's location or proximity to one or more references may be tracked at different resolutions depending on the embodiment. In FIGS. 2A to 2F, the tracking resolution is based on location resolution. Locations may also be treated as points, which may furthermore have intervening space. This treatment of location is consistent with the example illustrated by FIG. 1. Locations may also be treated as areas. This treatment of location is consistent with the example illustrating by FIGS. 2A to 2F. In the case that 100% of real world space is divided among discrete locations, the larger the number of locations, the higher the location resolution. Conversely, the fewer the number of locations, the lower the location resolution. Using numbers to illustrate, if each location of a 2-D grid based system like that of FIGS. 2A to 2F measures 10 m×10 m, the tracking resolution would be 100 times less than it would if each location of the 2-D grid based system measured 1 m×1 m. This aspect of resolution of tracking is inherent to existing systems of location determination, e.g. global positioning systems (GPS).

The resolution of an AR trail formed by one or more augmentations may also vary, in part due to the resolution of the definition of locations, and in part due to other factors. As a very simple example, in FIGS. 2A to 2F, as many discrete augmentations were produced as locations were visited by the tracked target. However, it may that in a variant embodiment, only every other location visited would be represented with an augmentation. It may be that a single augmentation is produced to represent a grouping of multiple locations. It may be that augmentations are produced on the basis of time, e.g., the location of the tracked target is represented with an augmentation at every increment of time (say every 60 seconds) and any changes in location in the intervening 59 seconds are either not tracked, not represented as augmentations despite being tracked, or both. As was the case in the example of FIG. 1, in FIGS. 2A to 2F, the visual appearance of augmentations involves a shade which changes from darker to lighter as the proximity of the user to a given location diminishes and/or as the time since the user was at a location grows. This is but one example of how augmentations may change in dependence on proximity.

Figure 3A:
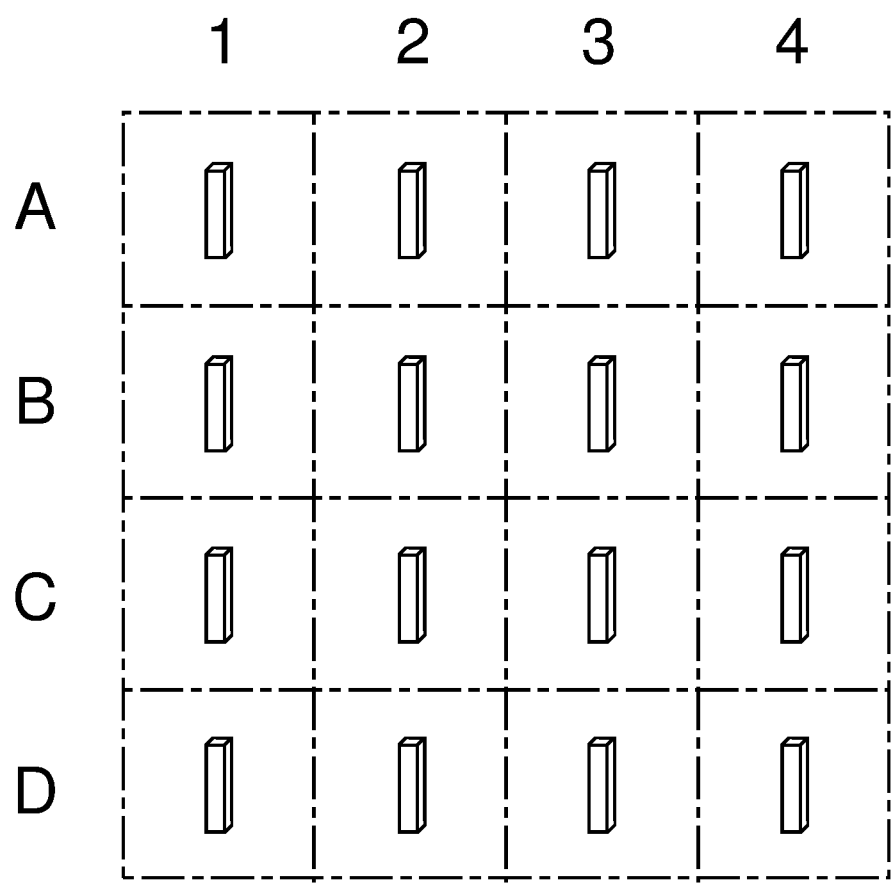
FIG. 3A to 3Q are schematic illustrations of an exemplary embodiment for producing proximity-based AR content of a dominos-type.
Figure 3B:
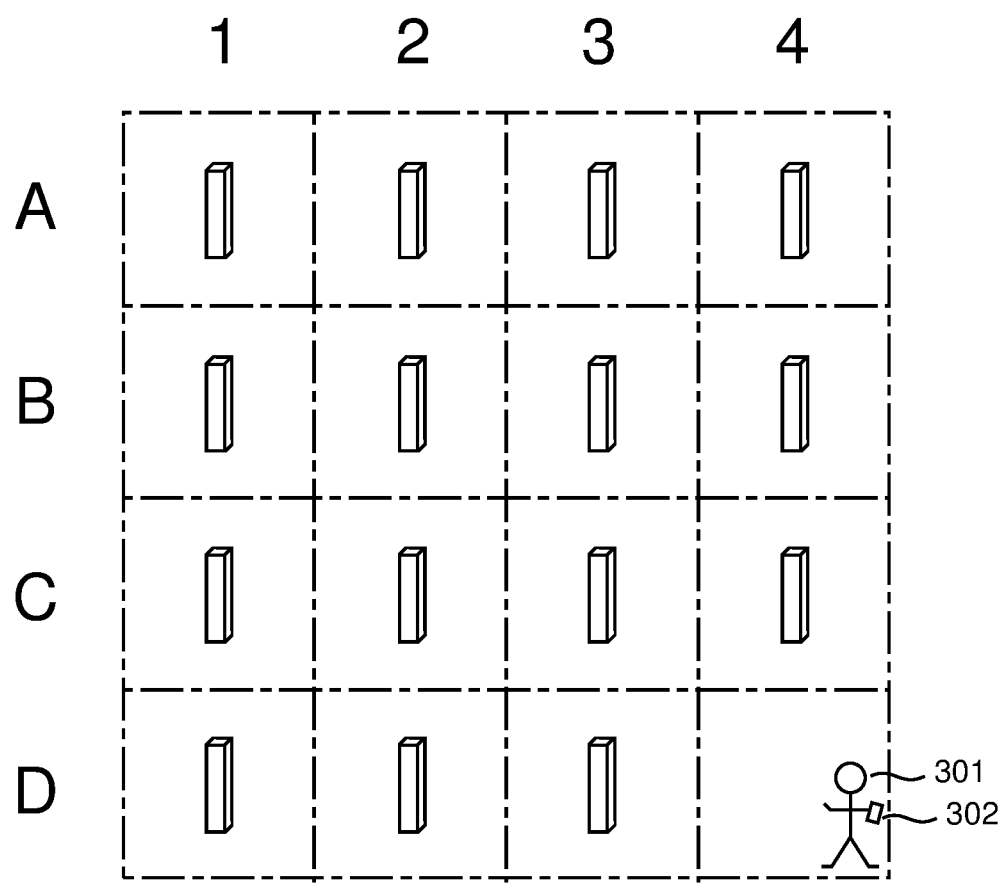
Figure 3C:
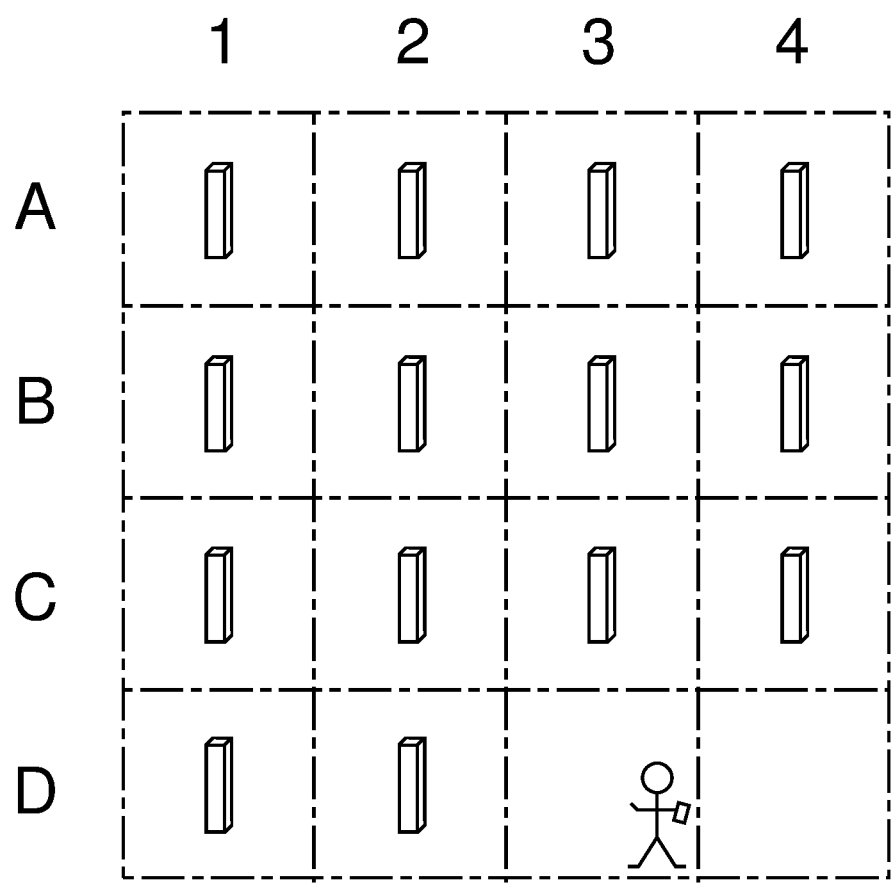
Figure 3D:
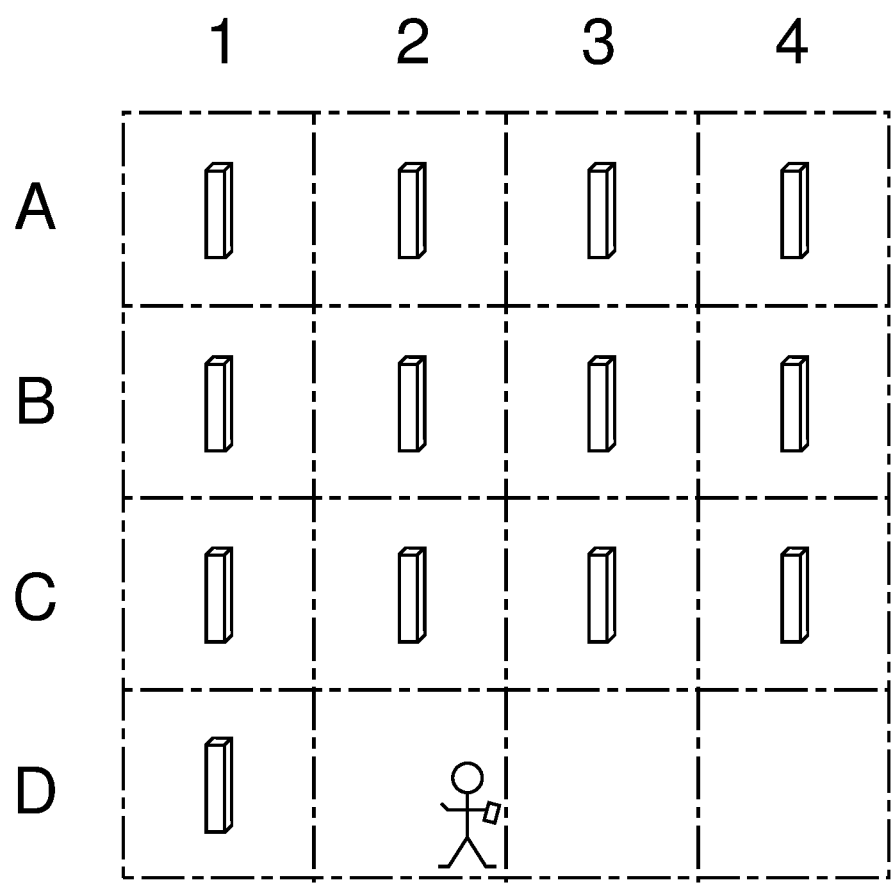
Figure 3E:
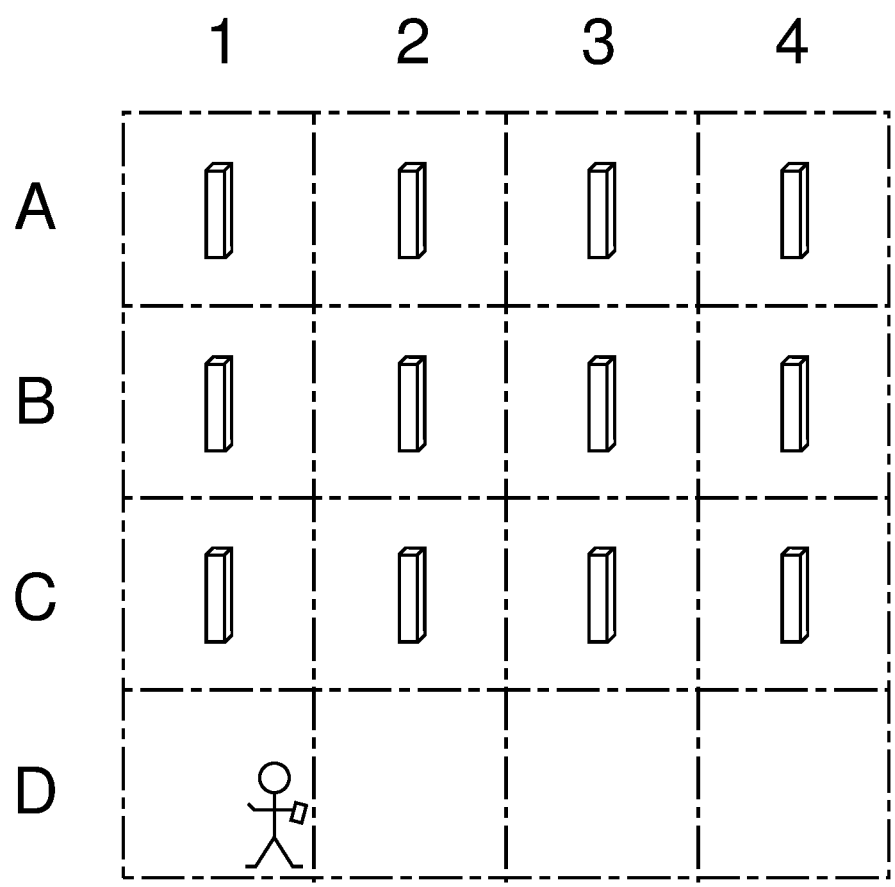
Figure 3F:
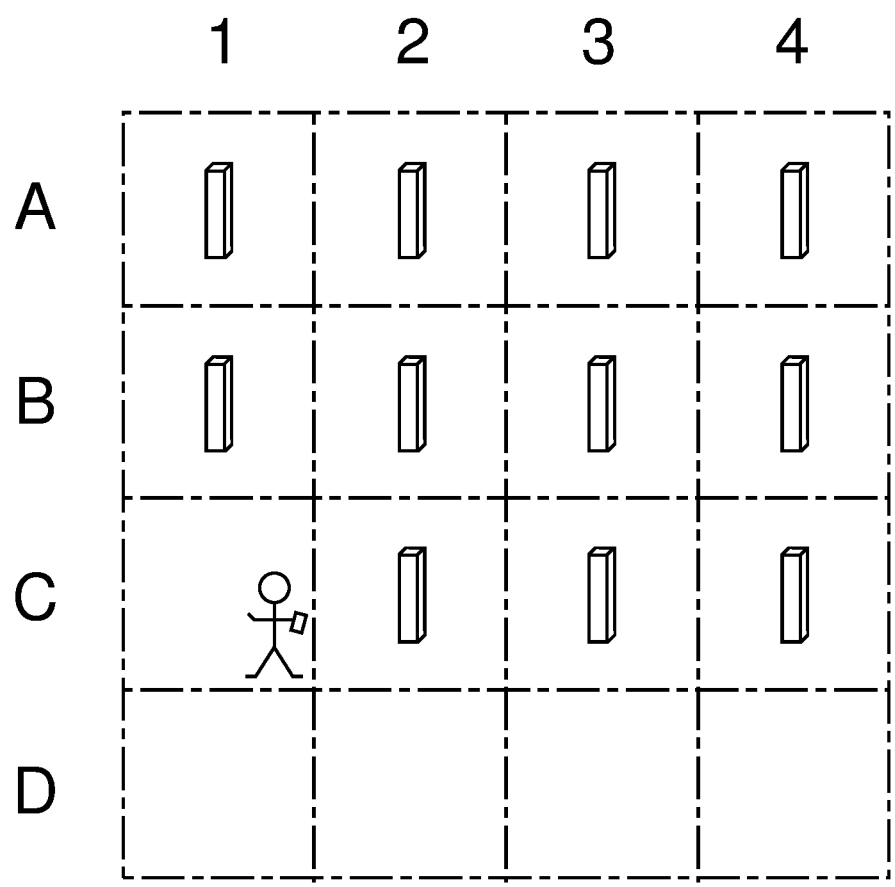
Figure 3G:
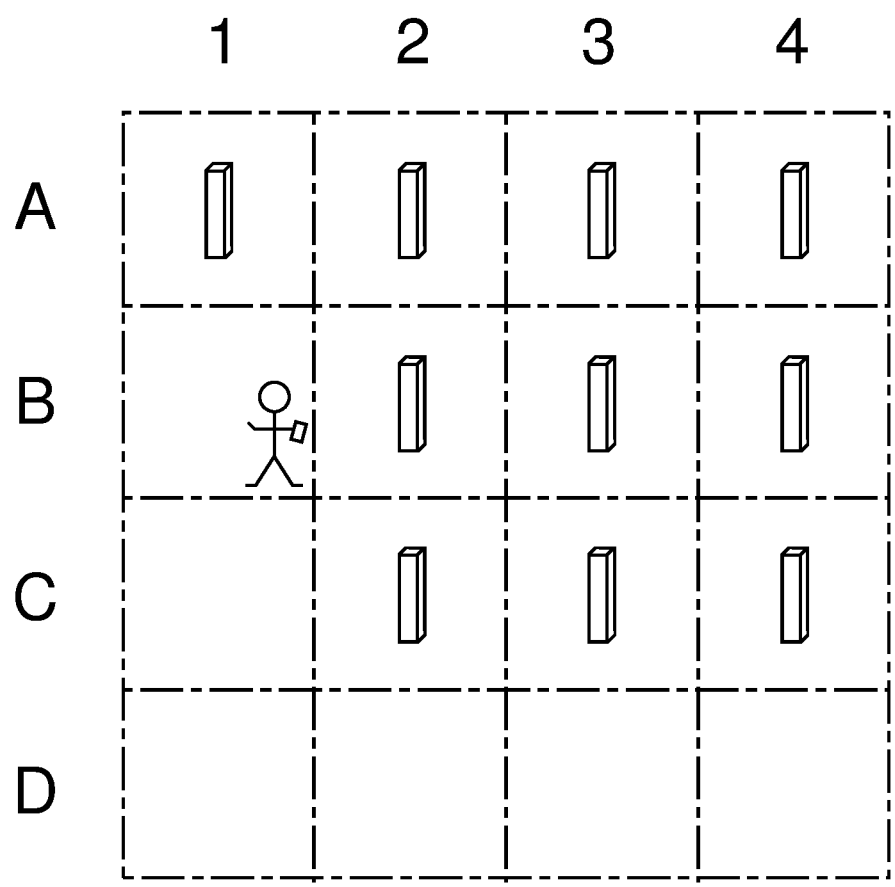
Figure 3H:
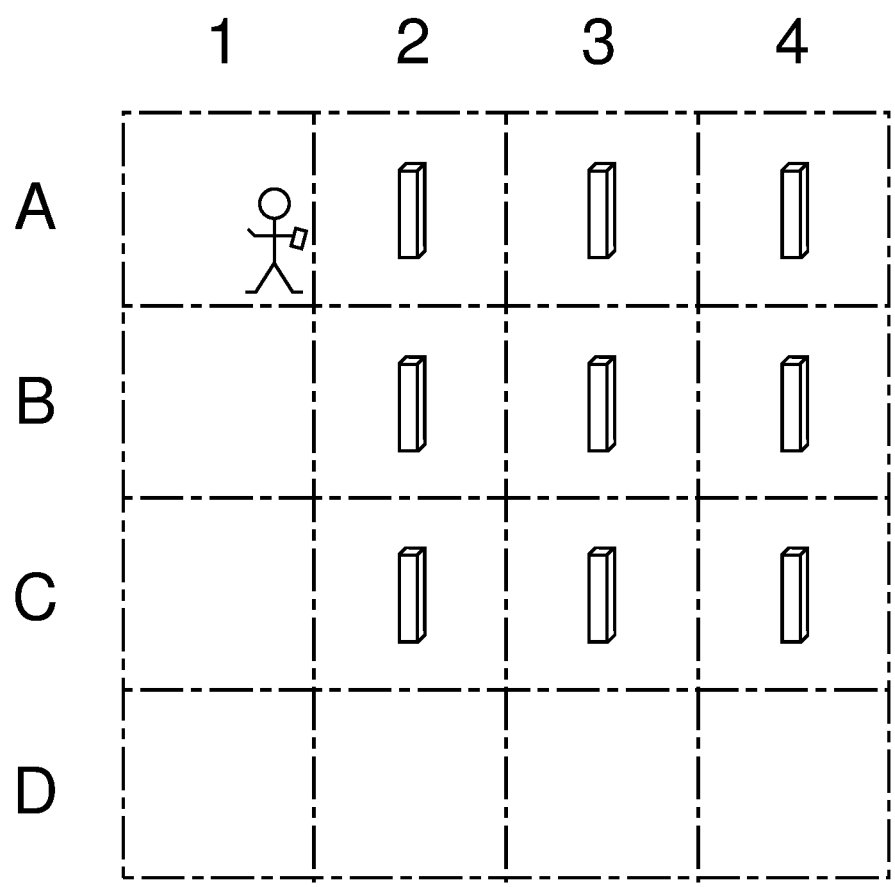
Figure 3I:
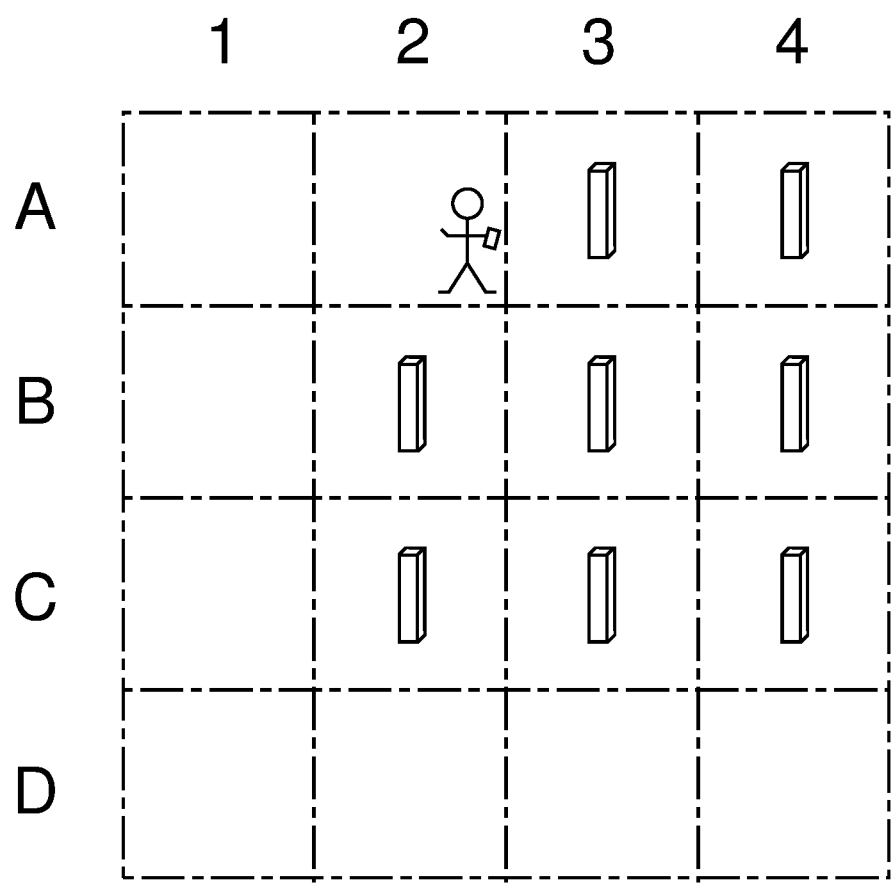
Figure 3J:
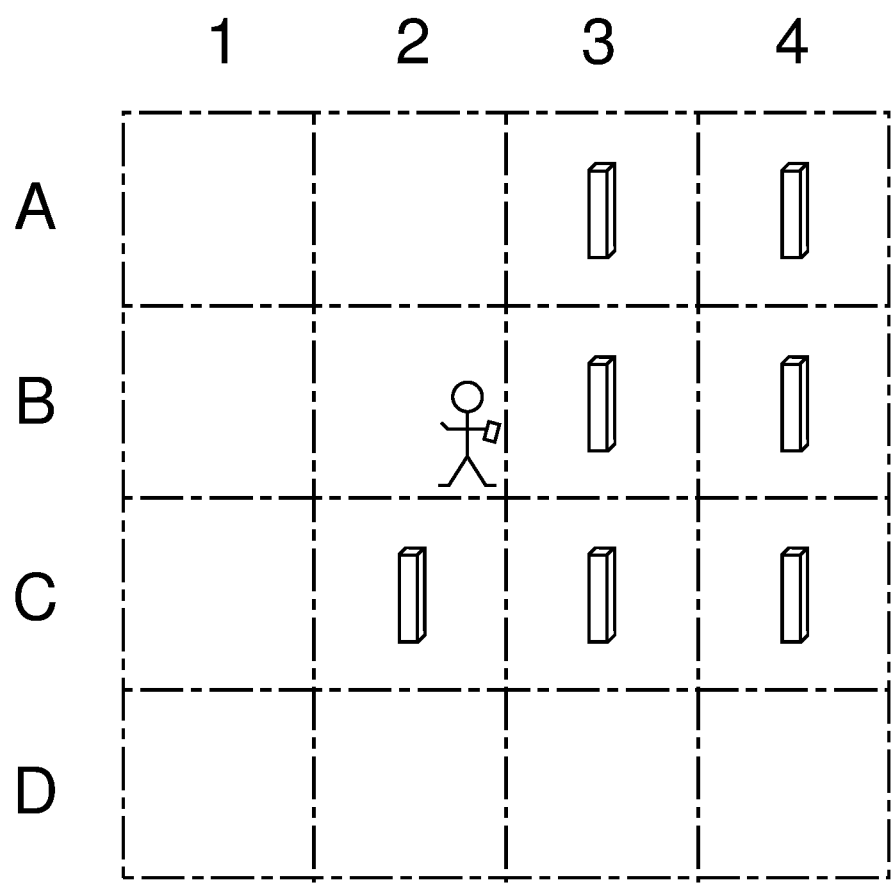
Figure 3K:
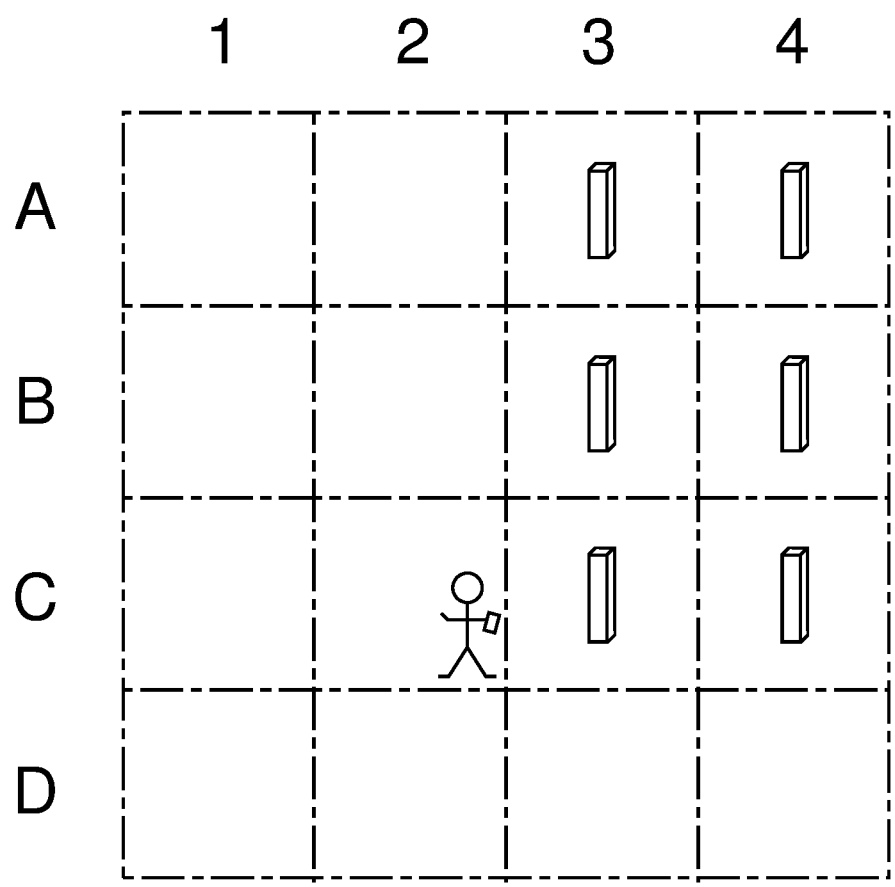
Figure 3L:
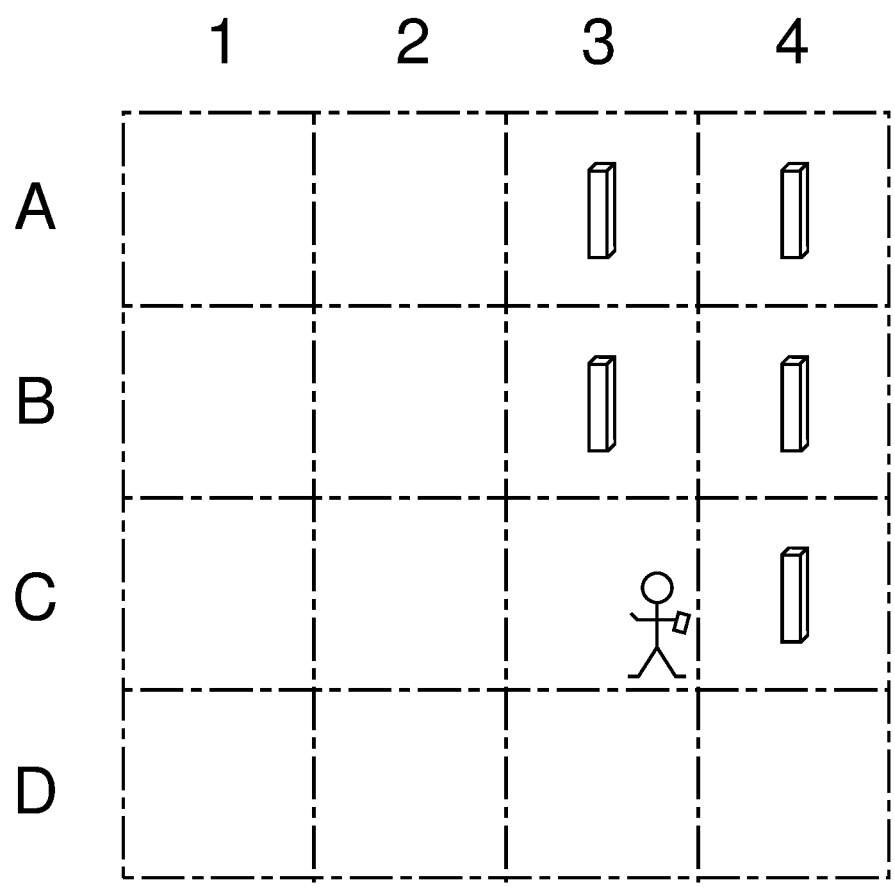
Figure 3M:
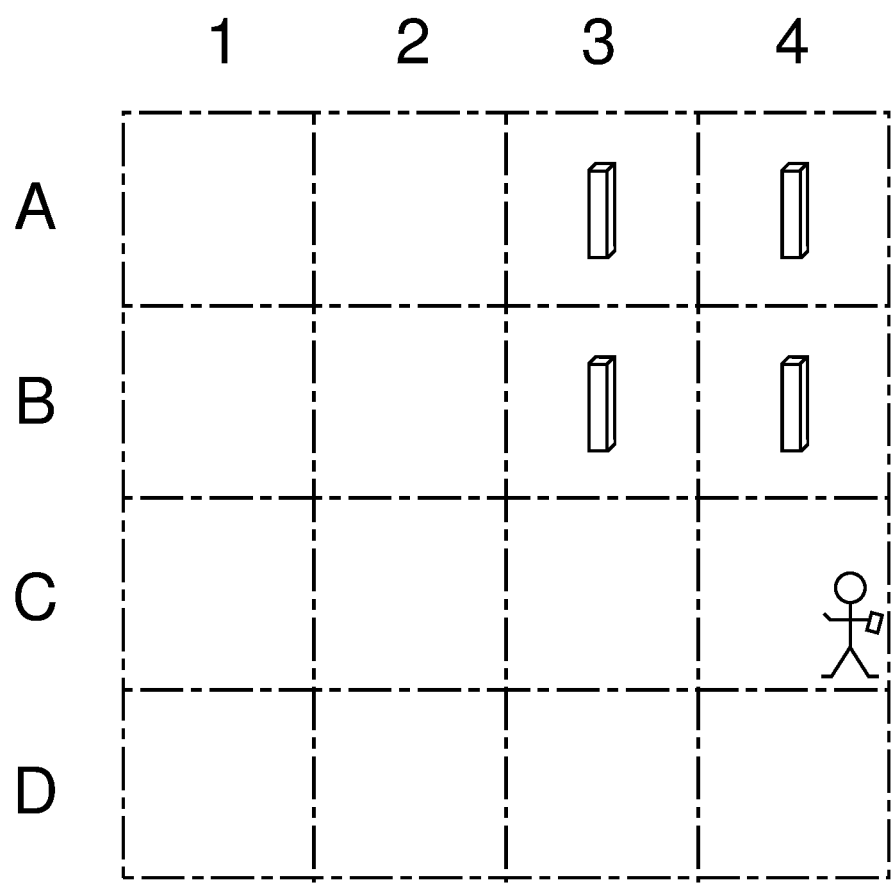
Figure 3N:
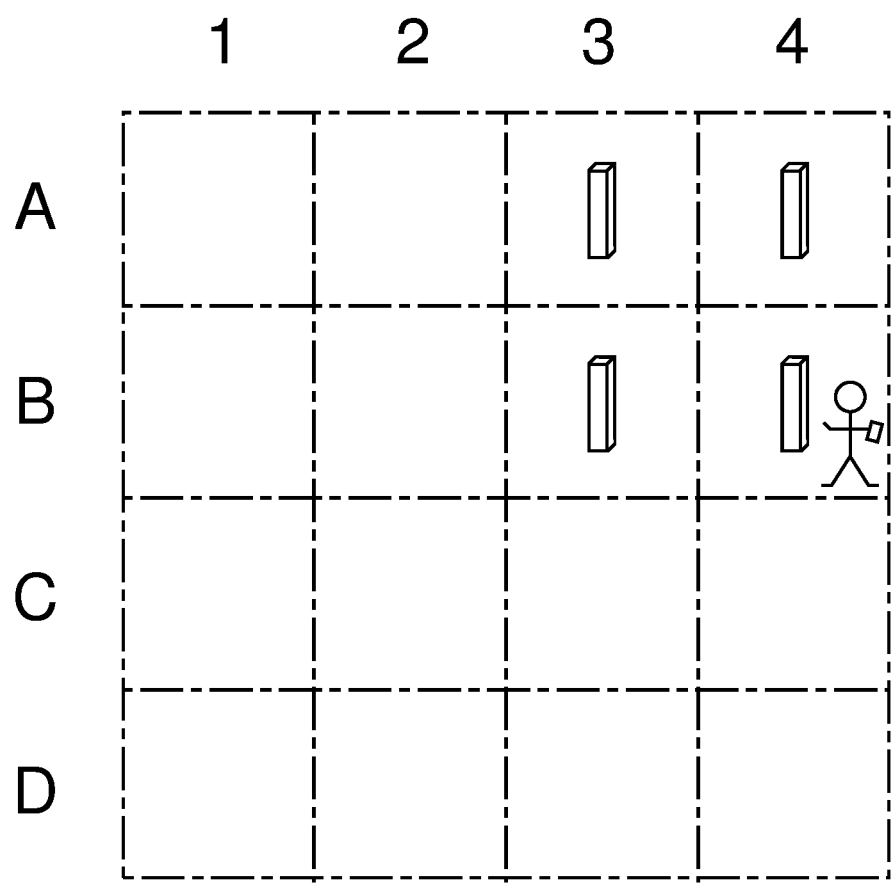
Figure 3O:
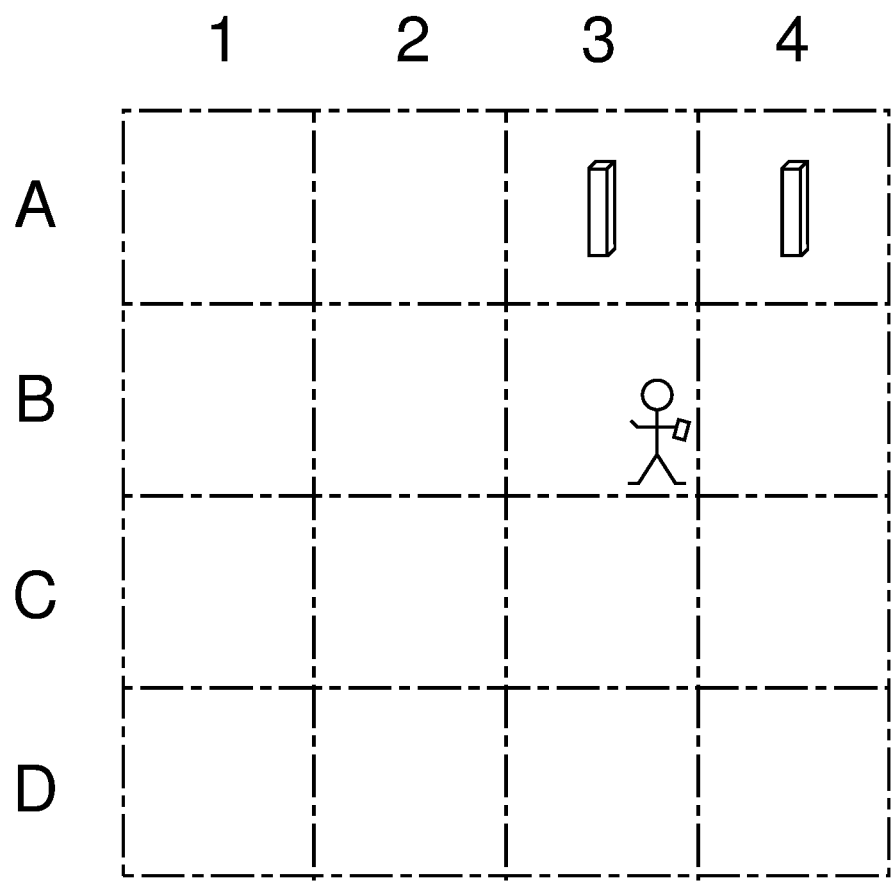
Figure 3P:
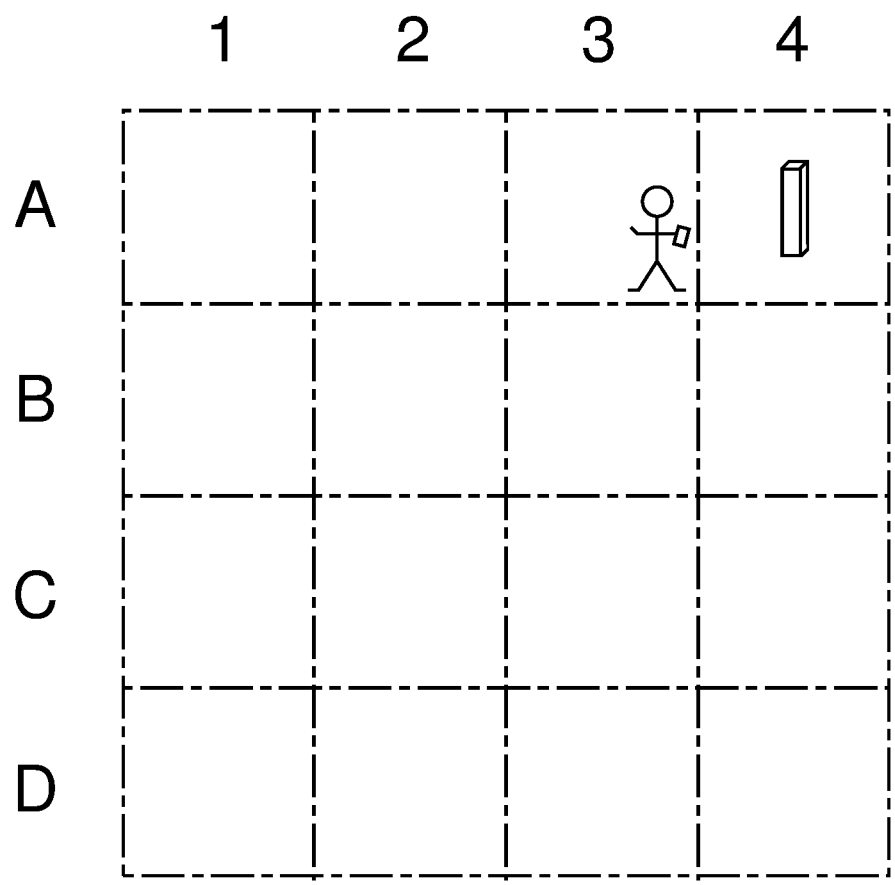
Figure 3Q:
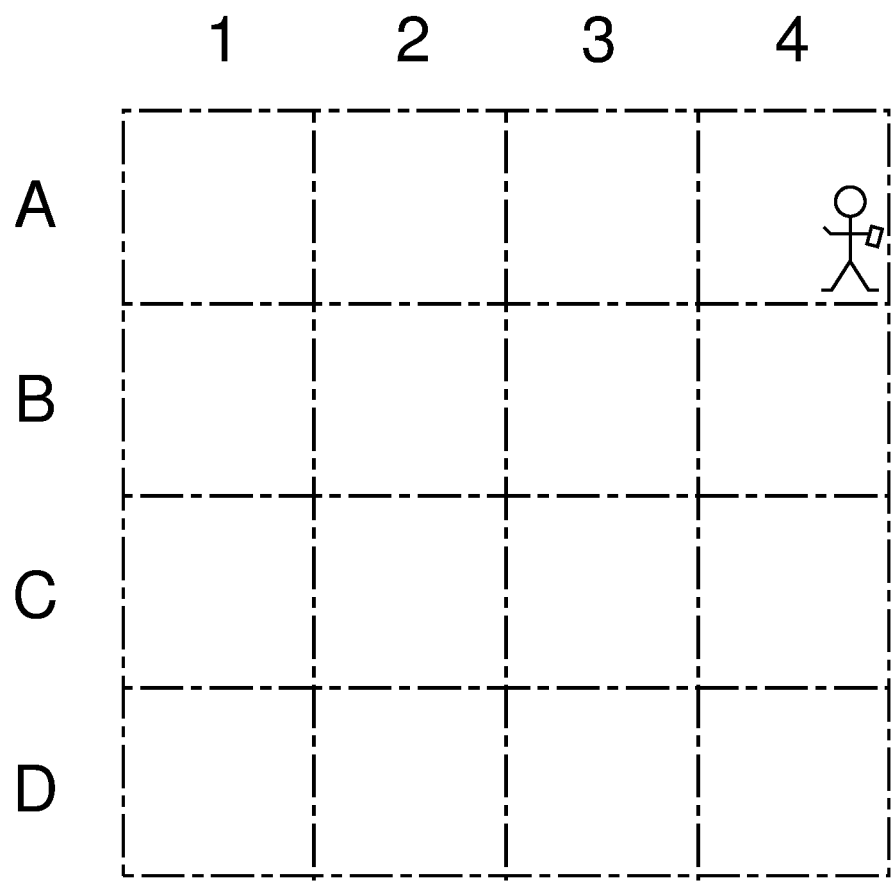

FIGS. 3A to 3Q illustrate another exemplary method for producing AR content that is proximity-based. In the examples of FIG. 1 or FIGS. 2A-2F, the presence of an augmentation associated with a real world location signified to a user that a tracked target had visited that real world location within some time period of interest (along with possible other information about the tracked target's travel history). The example of FIGS. 3A to 3Q shows the inverse, whereby the presence of an augmentation associated with a real world location may signify that a user has not visited a location within some predetermined time period of interest. In this case, AR content may contain one or more augmentations the presence and/or appearance of which signifies that the location (or locations) with which the augmentations are associated have not been visited within some predetermined period of time. In FIG. 3A, of 16 possible locations (A1, A2, A3, A4, B1, etc.), each is associated in the AR output with an augmentation (in this case, virtual posts). Each step from one figure to the next figure in the series of 3A to 3Q represents a step in time. As can be appreciated by viewing each of the figures in turn (especially as one would view a flipbook) the change in proximity of a target (either person 301 or device 302) with respect to a location, from being away from a location to being at a location, causes a change in the augmentation associated with the location in question. In this example, the change comprises the removal or deletion of the augmentation altogether, although other changes (e.g., a modification of appearance such as from one color to another color) may occur instead of outright removal of an augmentation.

Methods like that illustrated by FIGS. 3A to 3Q are particularly advantageous when, for example, the method is for clearing an area. As a prime example, law enforcement and security personnel may require checking a plurality of locations on a circuit or rotation to ensure public safety or private security of real property. An AR output like that of FIGS. 3A to 3Q gives an intuitive visual basis for assessing which locations have been cleared and which have not, based on whether or not an augmentation has been cleared away, or whether the augmentation remains unchanged from a default state signifying a location as unvisited within some time period of interest.

Thus far both breadcrumbs-type methods and dominoes-type methods have been described in such a way that proximity of a target to a reference is the main determinant, perhaps the only determinant, of whether an augmentation is added, removed, or otherwise changed. This need not be the case in all embodiments. Another condition or trigger which may lead to a change in AR content is a target's view. In particular, it may not only matter where a target physically travels, but where the target's eyesight "travels". In short, augmentations of an AR output may be changed based on one or more changes in proximity of a tracked target to a reference and/or the target's view of a reference.

The significance of the view criteria for determining whether to change an augmentation is illustrated well by the scenario of law enforcement or security personnel clearing locations while on patrol. A patrol may be conducted with a patrol car, from which an officer inside takes visual stock of the car's surroundings but does not physically leave the roadways or drive down every roadway (e.g., say a short alley connected to a main roadway). In this case, the physical presence of an officer in the alley may not be of particular criticality provided the officer's line of sight is able to reach the alley from one end. Thus, in an AR output, if the patrolling officer drives past the opening of an alleyway without directing his view into the alley, an augmentation corresponding to the alley may not be changed. By contrast, if the patrolling officer makes the same drive but directs his view into the alley, an augmentation corresponding to the alley may be changed or removed.

Another criterion which may be assessed to determine changes to augmentations is whether a particular action is taken by a target when at a reference location. For example, the consumer electronics show (CES) is a highly anticipated annual tradeshow (at least as of the writing of this disclosure). The CES, like many tradeshows, may involve booths at which respective companies showcase their products. A reporter at such an event must take particular actions in connection with her occupation—capture photographs or video content, conduct interviews, or read informational postings, for example. The proximity of a reporter (the target in this example) to a particular booth (a reference) may be of some interest to assess the reporter's coverage, but the actions taken by the reporter when at a booth are of particular consequence in their own right. For such contexts where not just locational proximity is of interest but also actions taken at locations, embodiments may be configured so that AR content is updated to signify what actions have been performed, or what actions have not been performed from some predetermined list. An action which may be signified by an augmentation may be any of a variety of actions. For example, the action may be taking a picture, sending an email, transmitting a signal (e.g., making a phone call), receiving a signal (e.g., receiving a phone call), activating a device, deactivating a device, etc.

The visual appearance of an augmentation may be configured to signify to a user an aspect of time. For example, the appearance may signify how old the augmentation is since it was created or since it was changed. The appearance may signify a date and/or time at which the augmentation was created or previously changed. For example, visual appearance of one or more augmentations may change opacity (e.g., fade) or change size (e.g., shrink) as time elapses, or as the augmentations age. A color, shade, or opacity of a visual augmentation may be configured to signify the amount of time since a target was at each augmentation's associated location. The visual appearance of the augmentations may indicate, for example, when the augmentation was created, how old the augmentation is, and/or how close or far the target is from the augmentation in real time.

The visual appearance of an augmentation may signify an aspect of speed. For example, if a tracked target passes a real location for which an augmentation is provided, the augmentation may visually signify the speed with which the tracked target passed the location. The visual appearance may also or alternatively give directional information. For example, the augmentation may include or signify a vector (e.g., arrow) which signifies the direction the target was moving when passing the location.

The visual appearance of an augmentation may signify the proximity of the associated real world location with some other real world location. For example, individual augmentations may indicate the measure of distance between the associated real world location and an end location, such as the end of a trail to which the augmentation contributes a visual path of "breadcrumbs".

In breadcrumb-type embodiments, multiple trails may be displayed simultaneously in AR content. In such cases, the augmentations of respective trails may be provided with different visual appearances to differentiate one trail from another. In dominos-type embodiments, multiple trails may be displayed simultaneously in AR content. The different targets which give different trails may or may not be differentiated in the AR output. For example, if law enforcement officers are clearing an area, identifying the particular officer who clears an area may not be important, in which case the AR content may be configured to show only that locations are cleared (by any officer) without encumbering the AR content with information conveying who cleared each location.

The visual appearance of an augmentation may be configured to signify dwell time. Specifically, an aspect of the augmentation's appearance may correlate with the amount of time a tracked target spent at the location corresponding with that augmentation. As one example, augmentations showing a trail of a tracked target may be portrayed as drops of liquid left behind by the target, not unlike the manner in which a person soaked by rain leaves a trail of drops in their wake as they pass through a hallway. If the target remains at a location for a protracted period, the augmentation may comprise a pool of droplets, and a size of the puddle may qualitatively show the duration of time the target dwelled at the associated location. Other visual representations of dwell time, either qualitative or quantitative, may be used depending on the embodiment.

In some cases, the identity of the target may be unknown or deliberately hidden from a user. A trail left by the target may nonetheless be presented. In some embodiments augmentations may be configured to signify to a user an identity of one or more targets and/or other users. A trail of augmentations may, for instance, comprise information which identifies a person or object which left the trail. As an example, this feature may be used by personnel who must verify, corroborate, or otherwise check the work of other personnel. In the dominos case, if an inferior is required to visited particular locations as part of a patrol, a change in augmentations to indicate the inferior visited (versus no one visiting or someone who is not the inferior visiting) provides a straightforward means for the superior to ascertain the performance and completeness of the inferior's patrol.

The AR content may be determined or changed based on location or proximities of a second tracked object (besides the target). In particular, a user's location may be tracked and the AR content supplied to the user changed based on the user's location. For example, one augmentation "crumb" may be made visible at a time. When a user reaches that augmentation (i.e., reaches the location associated with the augmentation), the next augmentation in the trail becomes visible. As another example, the next augmentation in a sequence may have a unique identifier that all others do not. For instance, the next augmentation may be blinking while the remaining augmentations are still. As the users's location changes as the trail is followed, which augmentation is blinking is updated and changed.

In most embodiments a target (or targets, as the case may be) move through a real three-dimensional real world space. The real world locations a target visits affect virtual objects and corresponding augmentations which are associated with the real world locations through which or past which the target actually moves. The same is not necessarily true of users. While users may also move through a real three-dimensional real world space, users may also take advantage of the systems and methods herein from very different locations or vantages. For example, a user may be at a remote location from a target yet be supplied VR or AR content which shows a breadcrumbs-type or dominos-type trail for the target. A user may be entirely stationary, e.g., positioned at a desktop at a command center, in a squat car, in a data center, etc. Of course, the ability to provide AR content to a user in the same real world setting through which a target has previously passed is particularly advantageous. However not all embodiments necessarily conform to this modality of content output.

Different users may be provided different augmentations, even in cases where the augmentations are based on the same virtual objects. For example, different information or different kinds of information may be shared with different users. Users may be assigned or attributed different clearance levels (e.g., security levels), and augmentations selectively chosen for output to a particular user based on that user's clearance level.

Significant time may or may not elapse between i) a time when a target visits, passes through, or passes by a location and thereby triggers a change in a virtual object and/or augmentation for that location, and ii) a time when a user consumes the VR or AR content generated at least partially based on the target's visit or passing. The date/times (i) and (ii) may be both substantially in real time. The date/times (i) and (ii) may be substantially delayed, e.g., minutes, hours, a day or more, a week or more, or a month or more. Indeed, some embodiments may be employed for visually recreating events of the past. In a criminal investigation, for example, investigators may be supplied VR or AR content which permits them to visually observe the movement or path taken by a suspect at some time in the past that is of consequentiality to the investigation. As previously discussed, though individual augmentations may be relatively fleeting, the use of virtual objects as a backbone for producing augmentations provides a basis for more perpetual storage without loss of trail information tied to particular real world locations. This modality of storing and retrieving information is both efficient and robust.

Several of the features described above will now be illustrated with an example involving law enforcement officers (LEOs) pursuing a criminal suspect. Assume a criminal flees a crime scene on foot. The criminal is the tracked target. His movement is tracked, at least to some extent, by one or more of a helicopter keeping track of him from the air, a mobile device carried by the criminal the position of which has been estimated by cell tower triangulation or a GPS signal, and street cameras recording the criminal briefly as the criminal passes the respective cameras. As the fleeing criminal takes some path through streets, alleys, buildings, etc., he (briefly) visits real world locations such as a street corner, an intersection, a postal office, a particular point identifiable with GPS coordinates, etc. Visiting a location does not necessarily require any more than a moment at the location. One or more of these locations is associated with a virtual object, and the information for such virtual object is updated to indicate information about the criminal's visit, e.g., whether he visited or not, when he visited, whether he visited for more than a moment, how long he dwelled if he dwelled, how fast he was going when he visited, which direction he was traveling when he visited, etc. A law enforcement officer (LEO) on the ground is in pursuit of the criminal and is following his trail. AR content is supplied to the LEO to assist his ability to understand what path the criminal took. Augmentations at some of the aforementioned locations are created, with possible visual appearance characteristics to signify some of the information previously listed, to inform the LEO. The real time location of the officers may be tracked so that their proximity to the virtual objects is known. As a result, the LEO may be provided AR content which only contains augmentations within a certain proximity of the LEO. As a result, the LEO is not inundated with the AR content for the criminal's whole path, but receives only those augmentations to which he is nearest. Which augmentations are provided may be updated as the LEO's location and proximities changes, keeping the AR content relevant to the LEO in real time. Meanwhile a command center may be provided with another form of AR content. At the command center personnel may be working from stationary computers. The computers may display real world content, such as footage from the helicopter or footage from the street cameras, with virtual augmentations showing the breadcrumb-type path created by the fleeing criminal. To the command center, both the criminal and the LEO are possible targets of interest. Thus, the virtual content served to the command center for display may include augmentations which also trace a path the LEO has taken and/or is in the act of taking. In this way the command center is provided the ability to monitor both the fleeing suspect and the LEO who is on foot chasing the suspect. The information concerning the suspect's path and the LEO's path may both be stored using virtual objects in a virtual model. Sometime later, say one month, a criminal prosecutor or investigator may access the stored information. AR content is provided to the prosecutor or investigator the content provided to the command center the night of the crime. The temporal gap between the events which formed the trails and the serving of AR content is made possible by the supporting virtual model and storage/retrieval system.

"User," as used herein, is an entity which employs a method, device, or system of the invention. A user may be a human, multiple humans, or some other entity. A user may be, for example, a person intended to consume AR content generated in accordance with a method or variant of a method disclosed herein. A user may be a person in pursuit of a mobile target. A user may be the target, such as would be the case that when a person wishes to retrace his or her steps and would benefit from AR showing where he or she previously visited, or what he or she did at visited locations, or how long he or she dwelled at visited locations, etc.

Figure 4:
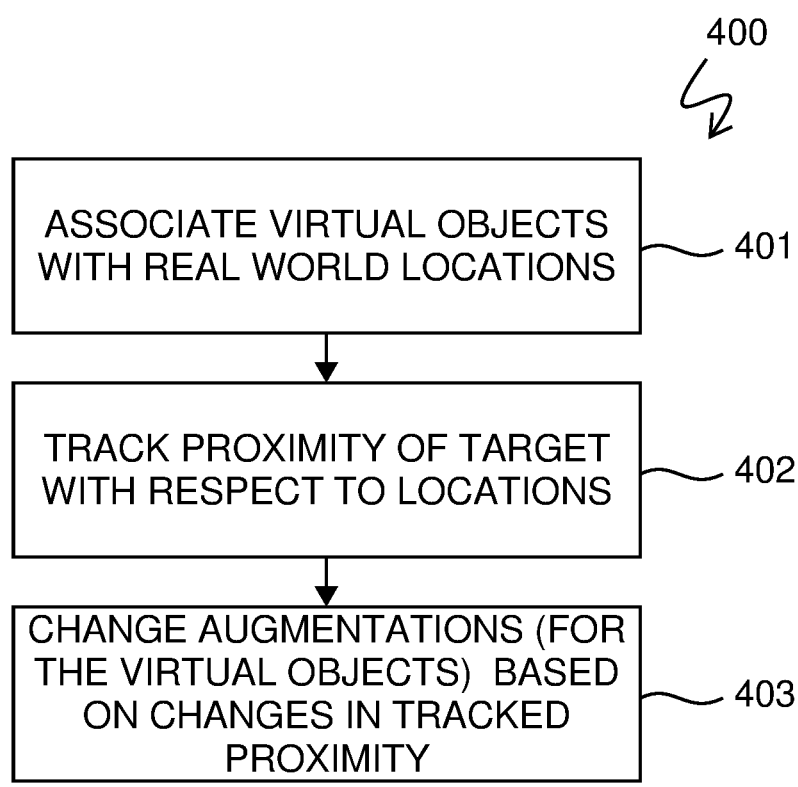
FIG. 4 is an exemplary method.

FIG. 4 is a flowchart for an augmented reality (AR) method 400 which may be used to achieve AR outputs such those of the preceding exemplary embodiments. Virtual objects may act as a backbone to the method in that they exist virtually yet are associated with real world locations (block 401). This association permits augmentations to be accurately and realistically placed in the context of the real world (i.e., in semantic context with the real world) when the augmentations are made based on information stored with the virtual objects. A trail, be it breadcrumbs-type or dominos-type, may be based on the movement of some target, and therefore some aspect (or aspects) of the target are tracked. In exemplary embodiments, proximity of the target with respect to certain locations may be tracked (block 402). The proximity information may be stored with the virtual objects associated with the certain locations. Based on changes in proximity recognized by the tracking step, augmentations of an AR output may then be changed to provide a user a simple and intuitive basis for understanding the target's movement history, e.g., where the target visited, how long the target visited, and how long ago the target visited, among other types of information as discussed throughout this disclosure.

Figure 5:
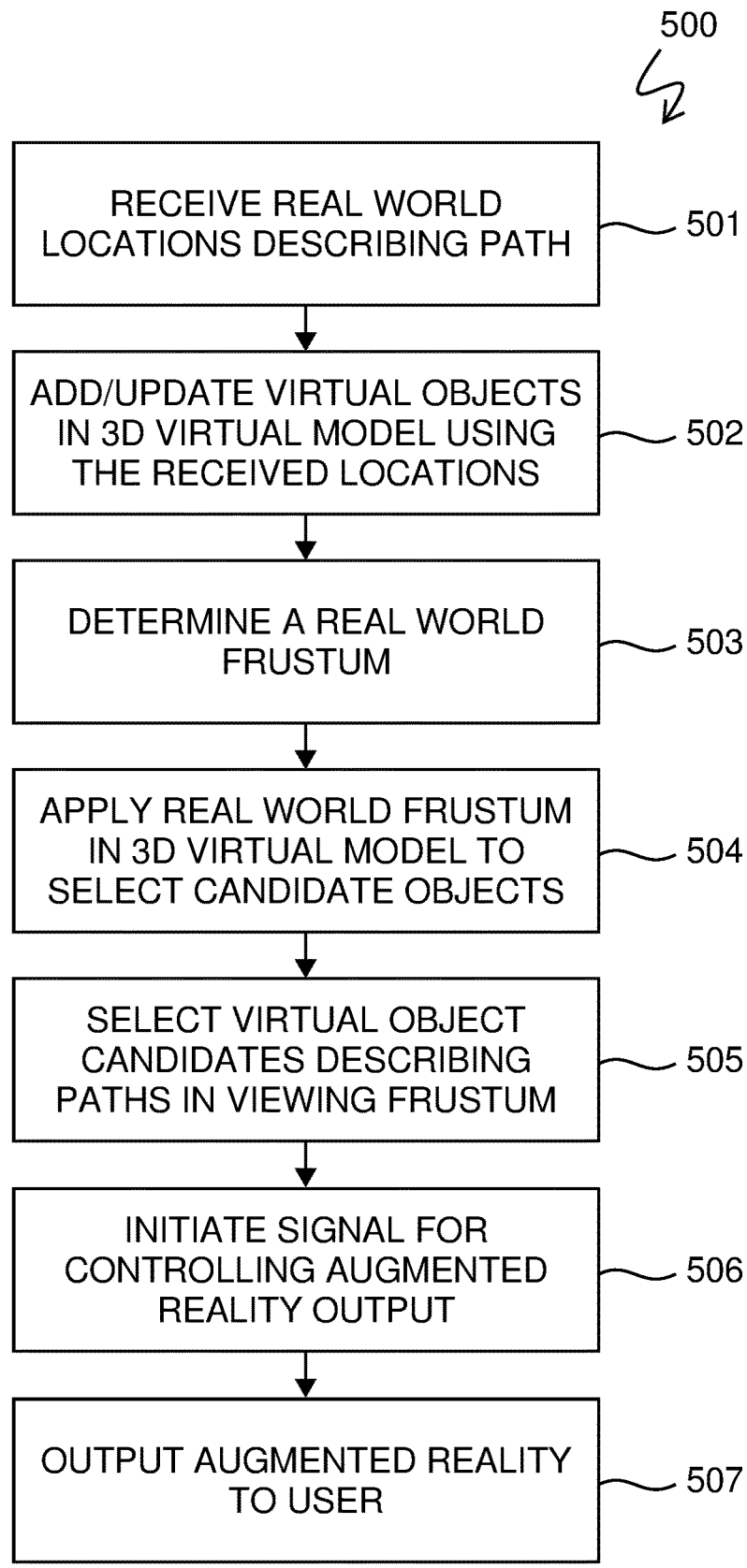
FIG. 5 is another exemplary method.

FIG. 5 shows a flowchart for an augmented reality (AR) method 500. Method 500 includes steps for determining which virtual objects to use when determining what the AR content should include for a given user, based on that user's unique circumstances.

FIGS. 6A to 6F illustrate relationships between real world, virtual world, and two alternative AR outputs for some exemplary embodiments. These figures will be referred to periodically to lend a visual understanding of the method of FIGS. 4 and 5. Individual figures are snapshots of time, with six times being illustrated (T1, T2, T3, T4, T5, T6). The virtual world is modeled after the real world, thus the resemblance of the two worlds within the figures. While virtual worlds may vary in size and scope, what is illustrated may be regarded as showing just that part of a virtual world which corresponds with that part of the real world illustrated. For obvious constraints like paper size only a limited amount of the real world can be shown in the figures. In various embodiments, virtual models may vary in in the degree of detail which is replicated from the real world. For instance, a real world building may be reproduced merely as a box in the virtual world, as a box with features like doors and windows, as a box with features like doors and windows together with textures of respective surface, etc.

In FIGS. 6A to 6F, everything depicted in the row labeled "REAL WORLD" is real (e.g., tangible, comprising matter, reflecting real light waves off their surfaces, etc.). The exceptions to this are the traditional patent drawing labels, and the marking of some locations small "x" indicia for identifying locations to the reader of this disclosure. These "x"s do not appear as indicia in the real world.

In the row labeled "VIRTUAL WORLD", everything is virtual. The virtual world involves data characterizing the real world and which, when suitably processed, permits an output such as what is shown in the figures. Virtual objects 611, 621, 631, and 641 may or may not take a visual form in the virtual world. In FIGS. 6A to 6F, some virtual objects are depicted as small cubes like object 611, 621, 631, and 641. The other items in the virtual world, including for example the trees 612, building 613, and mountain 614, may also each exist by means of one or more virtual objects.

The row labeled "AR1" shows augmented reality content for a first user. The row labeled "AR2" shows augmented reality content for a second user. Real world content is depicted in these rows using broken lines for ease of distinguishing real and virtual to a reader of this disclosure. In actual implementations, real content and virtual content may be indistinguishable, as may be desired for highly realistic AR.

Returning to FIG. 5, method 500 is a method for providing an augmented reality (AR) that may include AR paths (i.e., trails).

The exemplary process 500 describes how paths may originally be formed and stored as well as how paths may be retrieved for display in an output. At block 501, a plurality of real world locations are received that collectively describe a path used or useable to physically traverse a real world landscape. For example, this receiving step may comprise receiving the plurality of real world locations from a mobile electronic device as a result of the mobile electronic device physically visiting the respective real world locations. The mobile device may periodically transmit or store its location as it is moved by a user through a real world geographic space.

At block 502, the locations from block 501 are stored for subsequent retrieval and use. If the locations of interest are already associated with virtual objects, information stored by the virtual object may be updated.

In FIGS. 6A to 6F, the tracked target is a truck 610. In the real world, the truck 610 is driving along roadways from T1 to T4. With each step in time, a location is obtained for the truck describing the truck's path (consistent with block 501 of FIG. 5). Virtual objects 611, 621, 631, and 641 are added to the virtual world based on the received locations (consistent with block 502 of FIG. 5). The dotted lines 690 are indication to the reader of this disclosure the association of the real world locations with the respective virtual objects in the virtual world. Here new virtual objects are being added to the virtual world in FIGS. 6A to 6D and in block 502 of FIG. 5. According this approach, each newly created virtual object 511 has proximity of zero with respect to the tracked target (here, the truck). Once the target moves away from that particular location and its corresponding virtual object, the proximity of the target with respect to the location and virtual object increases to a value greater than 0. Alternatives to this approach exist. For example, the four virtual objects 611, 621, 631, and 641 may exist prior the start of a method 500 or the like. In other words, the four virtual objects 611, 621, 631, and 641 may already exist at T1. In this case, block 502 may alternatively or additionally comprise updating virtual objects based on the tracked target's proximity with respect to the location associated with each respective virtual object (or some other parameter besides proximity). Indeed, at any time after a virtual object's creation, its proximity with respect to a tracked target may be monitored and updated.

Blocks 503 to 505 of FIG. 5 involve retrieving a path from storage (e.g., memory) for subsequent use in an augmented reality output at a user's AR device (e.g., a head mounted display, a mobile phone, a tablet, a laptop, a wearable device, etc.).

At block 503, a real world frustum is determined. This real world frustum is regarded as the user's viewing frustum, and may correspond with the viewing frustum of a camera or cameras of an AR device which captures real world image data describing the user's real world surroundings. A real world frustum may be determined based on one or more of, for example, a present location (e.g., of the AR device), a field of view (e.g., of the AR device's camera), an orientation (e.g., of the AR device's camera), a position (e.g., of the AR device or camera), a pose (i.e., a combination of position and orientation), and assumptions about the near and far field limits (e.g., predetermined values for near and far field limits).

At block 504, the determined real world frustum is applied to the virtual world of the 3D virtual model. Essentially, the real world frustum is used to set the viewing frustum within the virtual world. Virtual objects which are inside the (now virtual) viewing frustum are found as candidates for augmentation. Virtual objects lying entirely outside the viewing frustum are not candidates for augmentation.

At block 505, a selection of augmentations based on the virtual object candidates occurs. This selection may involve one or more criteria including, for example, user option selections and the relationships between different virtual objects. In particular, virtual object candidates are selected which collectively describe a path or trail from the AR user's location (or approximate location) to some other location of interest, generally referred to as a destination location.

Figure 6A:
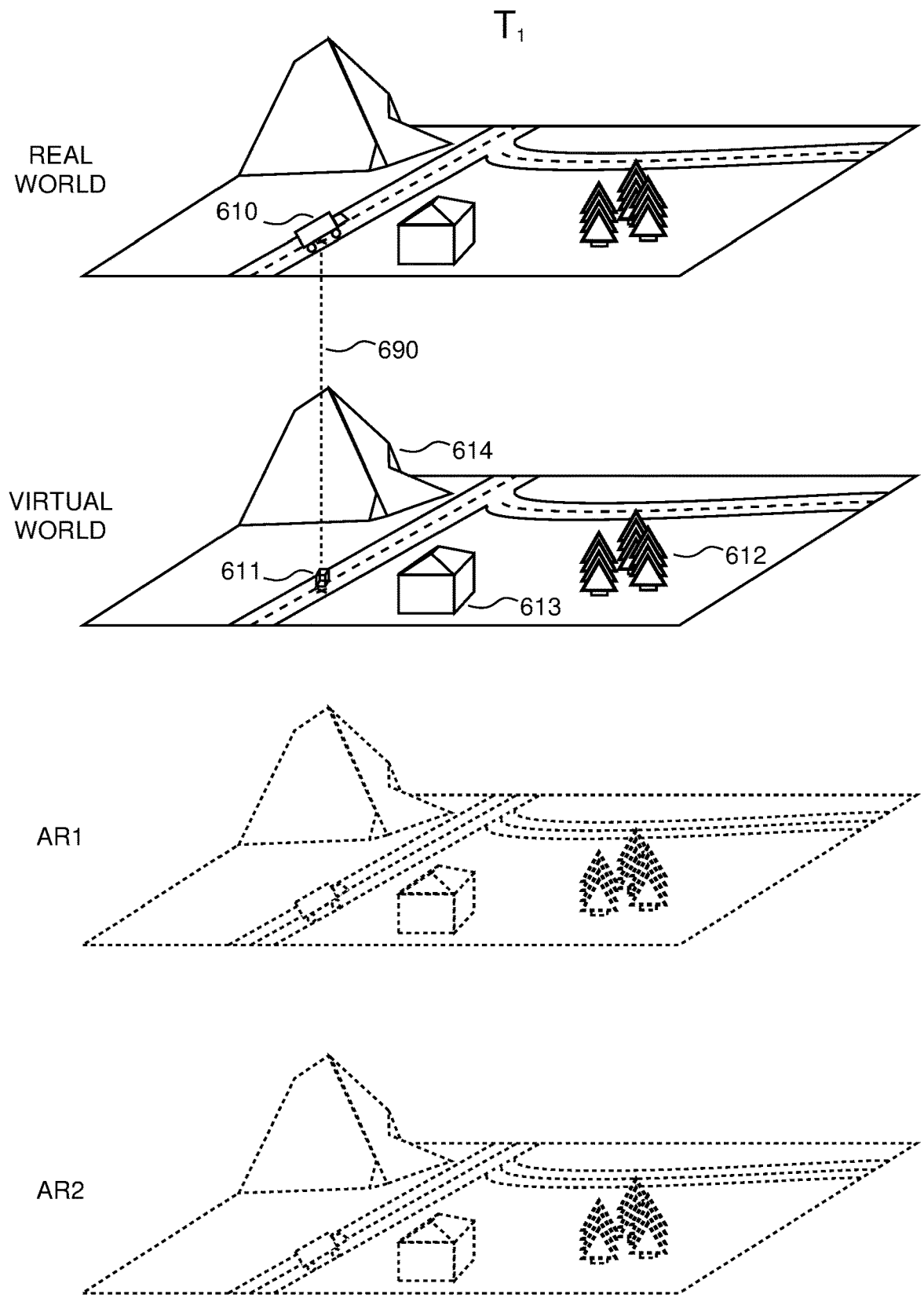
FIGS. 6A to 6F are illustrations of an exemplary embodiment.
Figure 6B:
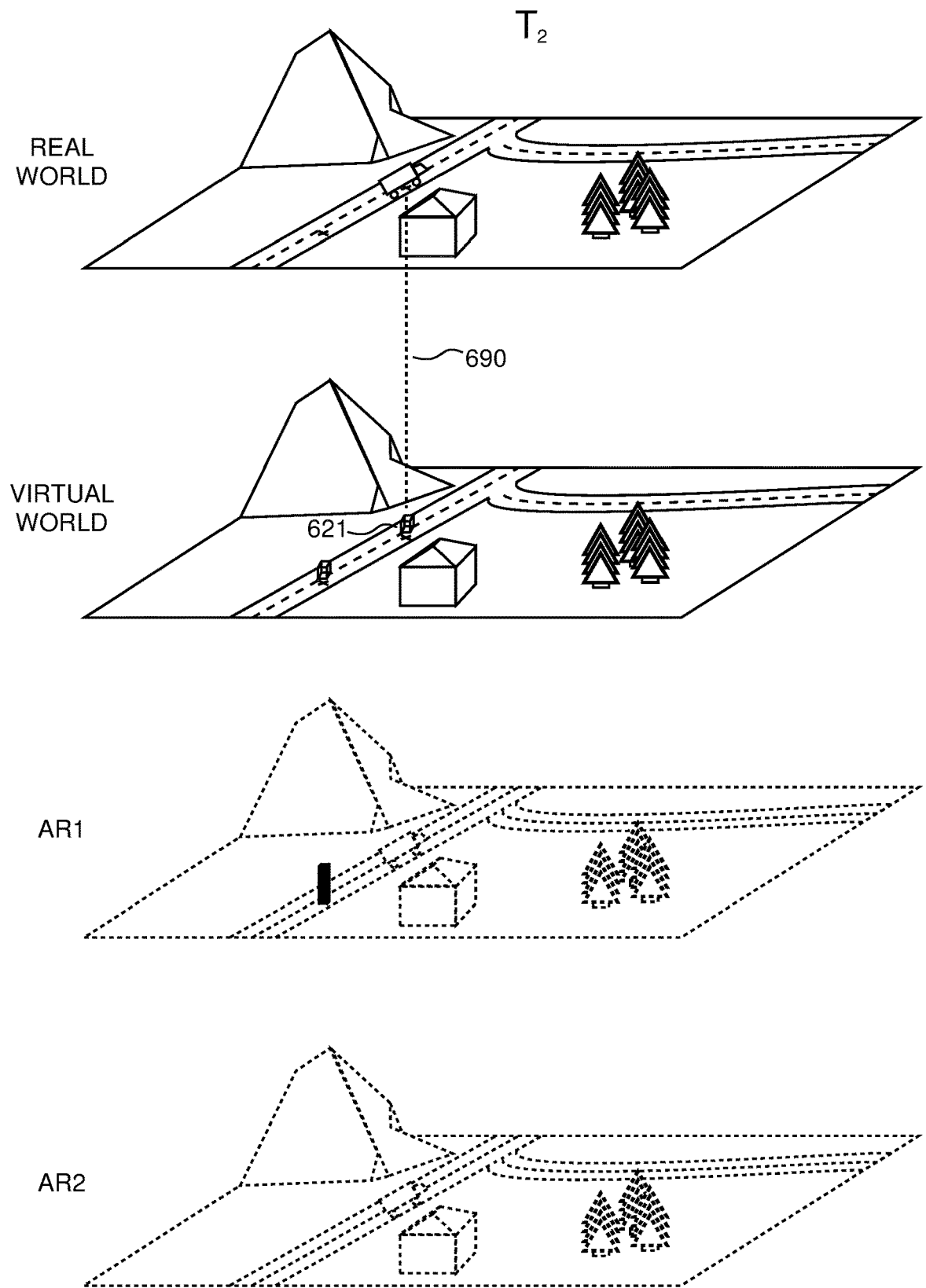
Figure 6C:
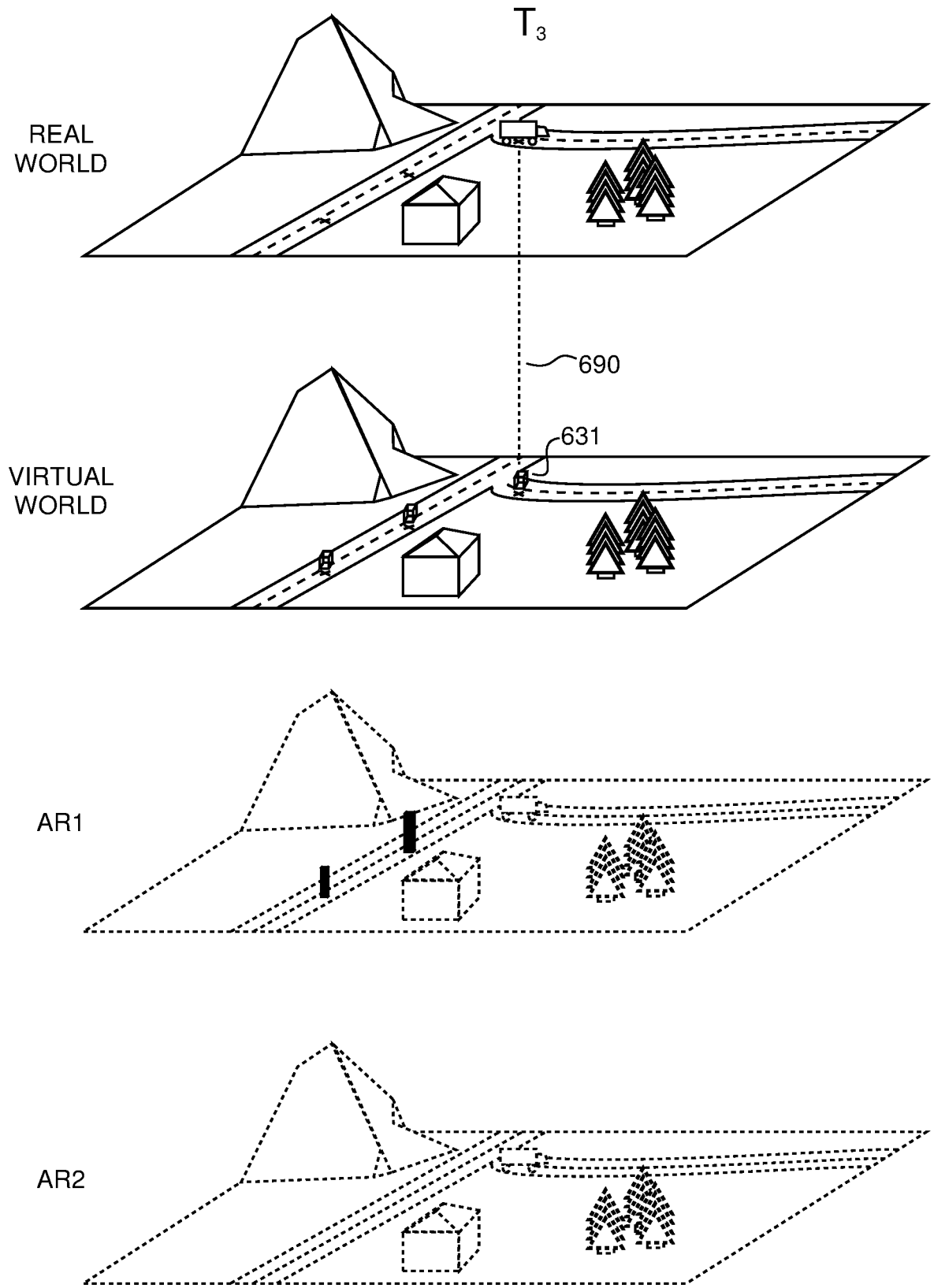
Figure 6D:
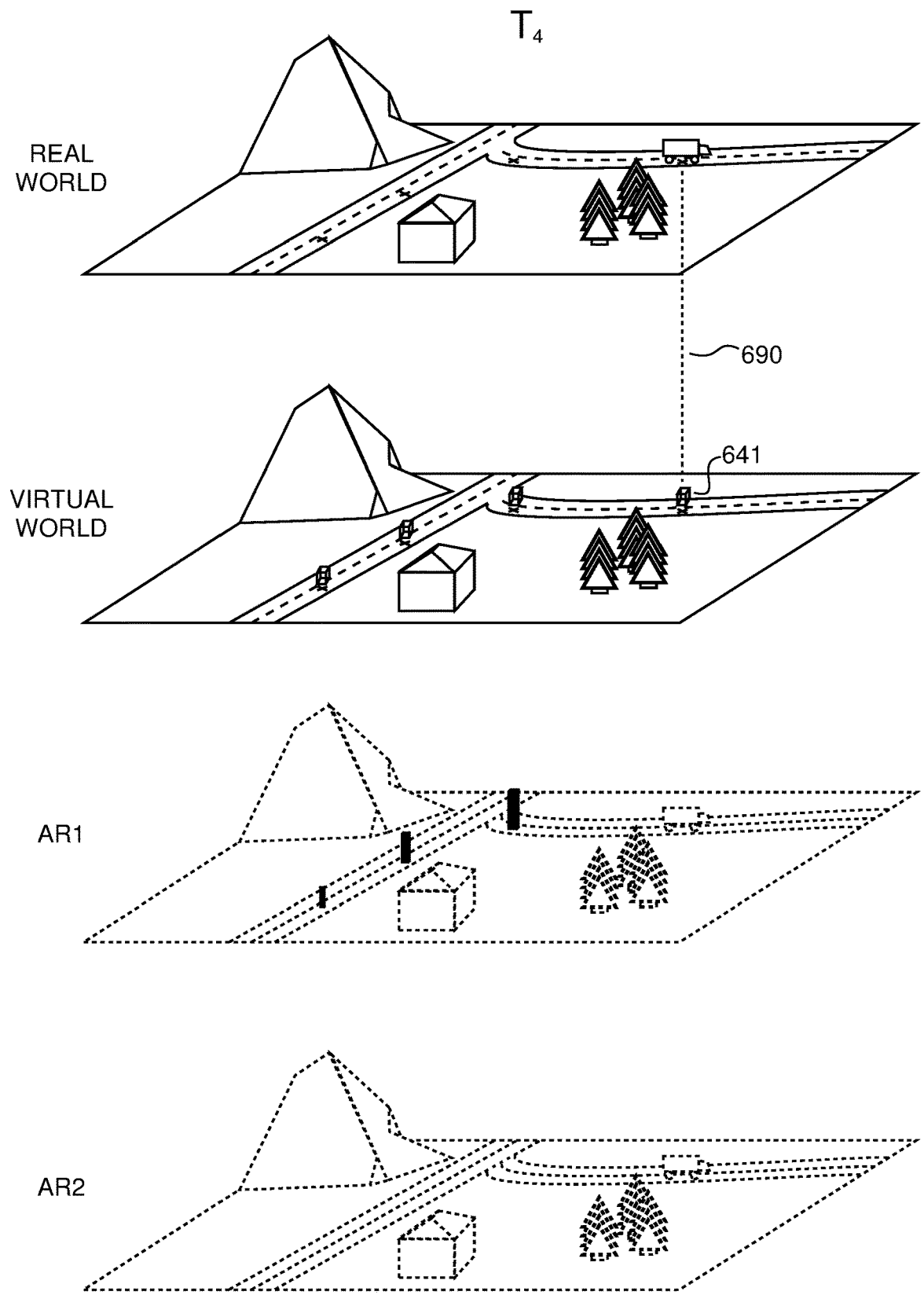
Figure 6E:
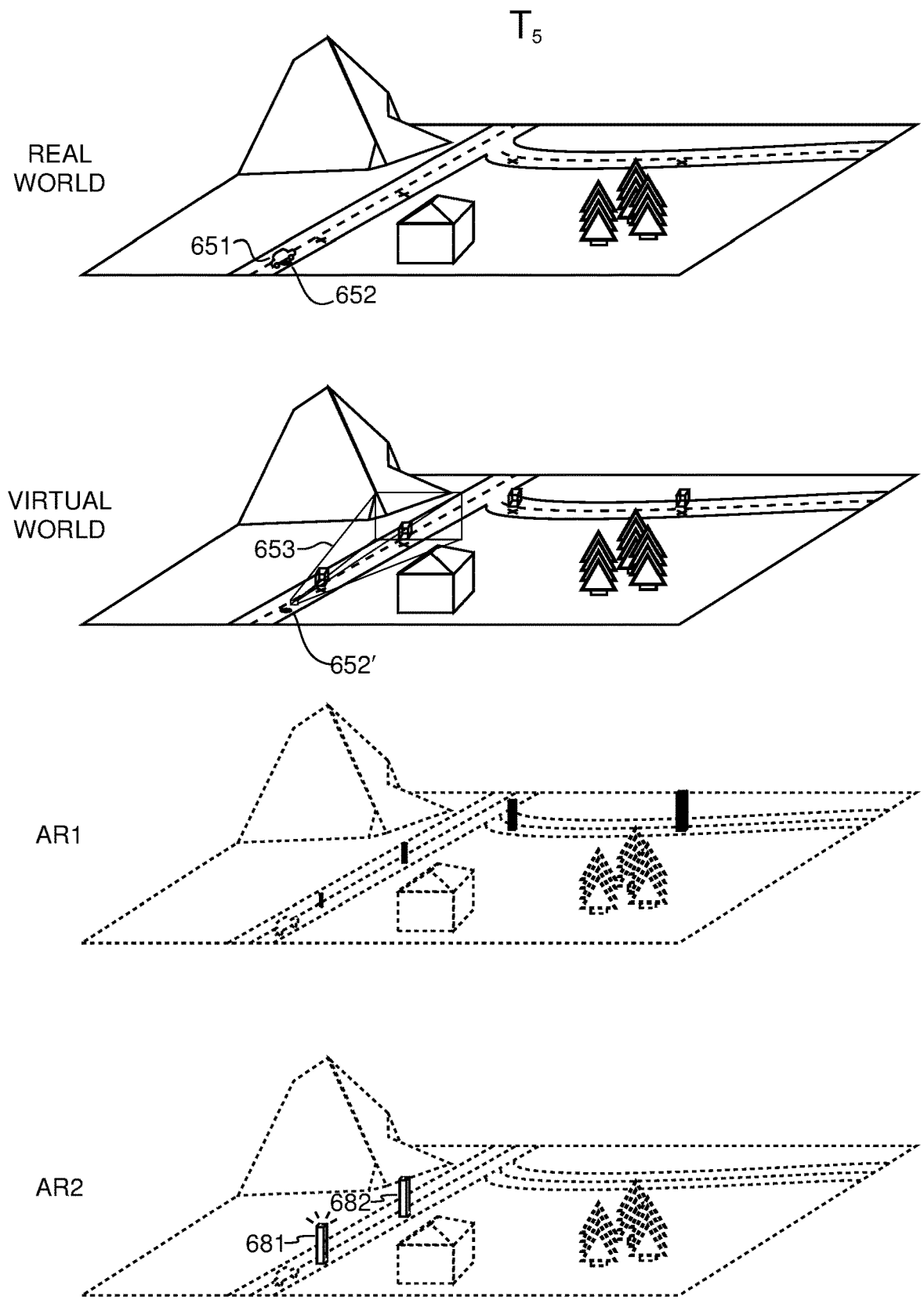
Figure 6F:
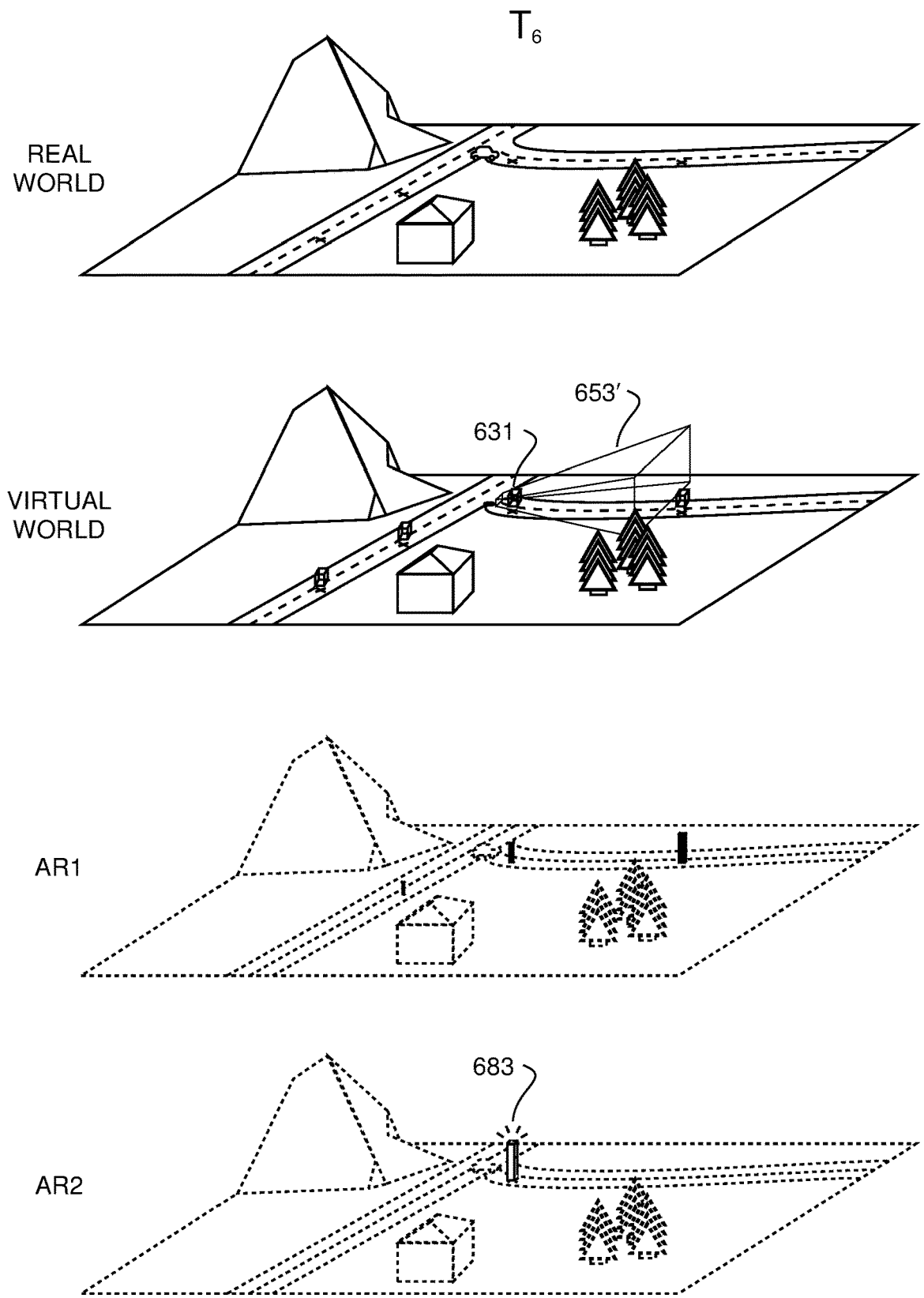

In FIGS. 6E to 6F, a car 651 is both a tracked target and a user. The car 651 exists in the real world. For purposes of this discussion, the car's real world location is marked with a black circle 652, and the corresponding virtual world location with a black circle 652'. The real world frustum for the car 651 is assessed from location 652 and takes into account factors listed above such as the orientation of the car (consistent with block 503 of FIG. 5). As shown in the VIRTUAL WORLD row, the real world frustum is applied in the virtual world to select candidate virtual objects (consistent with block 504). From FIG. 6E it should be apparent that two virtual objects (depicted as cubes) fall within the applied frustum 653. Accordingly, these two virtual objects may be selected for augmentation (consistent with block 505).

At block 506, a signal is initiated to direct or control the augmented reality output of an output device. The output device may simply be the original AR device for which the viewing frustum was previously determined. Depending on where the signal originates, it may be transmitted over a network such as one or more wireless networks and/or the Internet. In this way, processing related to process 100 may be performed on one or more remote computers (e.g., servers) of one or more cloud network, with output still being served to an end user on a network connected AR device. Alternatively, a single end-user device may be configured to perform much or all of process 500, in which case the signal initiated at block 506 may be initiated by a processor of the device and transmitted over a hardware connection to an output element such as a display (e.g., digital screen).

At block 507, the augmented reality is ultimately output to the user. Here, the signal of block 506 is used by an output device such as a head mounted display (HMD) or a digital display to show the augmentations together with real world content. The augmentations may include visual augmentations which are superimposed on the real world view. Significantly, the visual augmentations may form a visual trail or path configured for a user to follower.

FIGS. 6A to 6F show two alternative augmented reality contents. Augmented reality may by definition include both real world content and virtual world content. Real world content may be passively present, as with see-through head mounted displays (HMDs). Alternatively, real world content may be captured with a camera and subsequently displayed (e.g., on a screen). The virtual content (i.e., augmentations) may be supplied as overlays or otherwise imbedded with the real world video content. To assist in distinguishing types of content illustrated in the drawings, AR1 and AR2 are illustrated such that real world content is shown in broken lines and virtual content (i.e., augmentations) is shown in solid lines. In reality, the real world content would substantially resemble the real world, and the augmentations would appear however embodiments are configured to make them appear (e.g., as described in this example or elsewhere in this disclosure).

Figure 9:
FIG. 9 is a frame of an augmented reality output in which an urban area has been augmented with path marker augmentation.
Figure 10:
FIG. 10 is a frame of an augmented reality output in which a wooded area has been augmented with trail marker augmentations.
Figure 11:
FIG. 11 is a frame of an augmented reality output of a park at night which has been augmented with trail marker augmentations.
Figure 12:
FIG. 12 is a frame of an augmented reality output of a dividing bike trail which has been augmented with trail marker augmentations.

Note the perspective from which this content may be shown to a user may vary. As depicted for a reader of this disclosure, both AR1 and AR2 use the same third-person elevated perspective as used for depicting the real world and virtual world. In general, AR outputs according to exemplary embodiments may take any of a variety of perspectives, including third-person, first-person, top-down, aerial, elevated, others, or some combination of these. FIG. 9, for example, shows a screen capture of AR content from an elevated third-person perspective. FIGS. 10, 11, and 12 show screen captures of AR content from first-person perspectives.

AR1 shows AR content which is based on changes in proximity of the truck with respect to real world locations. Thus, in the case of AR1, the truck is treated as a tracked target. Note that in the case of AR1, steps involving viewing frustums have not been illustrated. AR1 is a breadcrumbs-type AR in which the tracked target—the truck—appears to leave a trail of "crumbs" in the form of location-specific augmentations. The augmentations are configured in both position and appearance based on information from their corresponding respective virtual objects. In this example, the closer an augmentation to the tracked target, the larger the augmentation. Conversely, the further an augmentation from the tracked target, the smaller the augmentation. This is but one illustrative example.

AR2 is AR content generated on the basis of the car 651 being both a tracked target and a user to whom the AR content may be provided an AR output. (Specifically, the user may be the car or its operator, for example.) AR2 is an AR content which is based on changes in proximity of the car 651 with respect to reference locations associated with virtual objects 611, 621, 631, and 641. Note that the virtual objects 611, 621, 631, and 641 were nevertheless created on the basis of the truck 610 being a tracked target. This merely illustrates that multiple targets may be tracked, for similar or for different reasons, to ultimately yield AR content for a particular embodiment.

The location of car 651 is indicated in the virtual world as a dark circle to distinguish it from the "x" indicia for locations of the truck 610. As discussed above, which of the virtual objects are candidates for use in generating the AR content varies depending on the applied frustum 653 or 653'. As was discussed above, virtual objects 611 and 621 were selected at time T5 (FIG. 6E). Accordingly, virtual object 611 and 621 are used to generate augmentations 681 and 682, respectively. At T6, shown in FIG. 6F, the same method 500 from FIG. 5 may be employed to apply the frustum 653', select the virtual object 631, and generate a corresponding augmentation 683. As discussed elsewhere in this disclosure, a variety of information stored with the virtual objects may be used in determining the particular attributes of the augmentations. In this particular example, of the candidate objects, virtual object 611 has the closest proximity to the car 651 (the target). This information is signified by making augmentation 681 blink or flash whereas augmentation 682 does not blink or flash.

Figure 7:
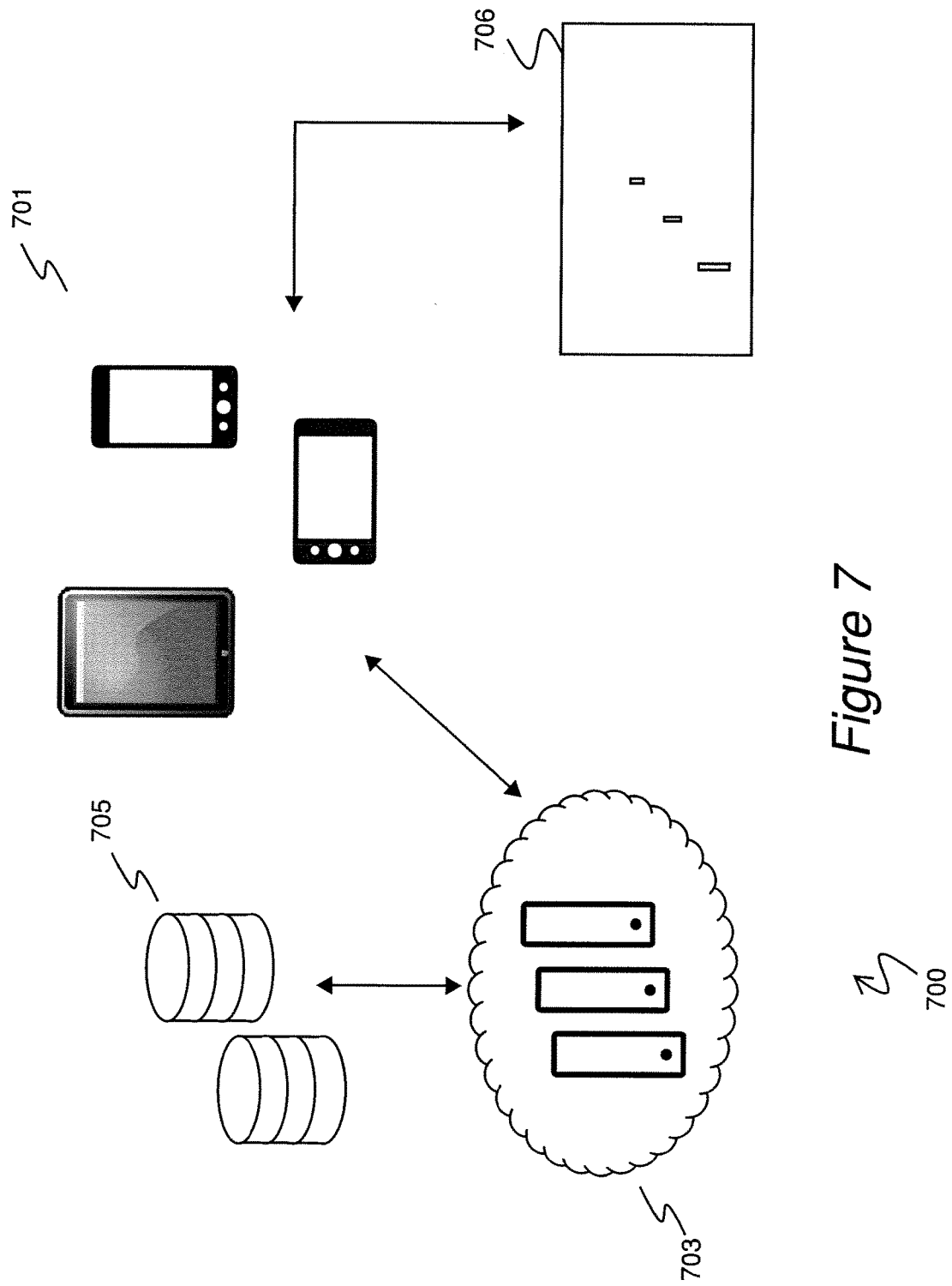
FIG. 7 is a block diagram of an exemplary system.

Thus far in the disclosure, attention has been focused on methods or processes which allow for augmented realities involving navigation, trail forming, trail following, area clearing, and the like. Such exemplary processes are generally carried out by some combination of hardware, software, and firmware, either in a particular electronics device or by a system of electronic devices. FIG. 7 is a schematic of an exemplary system 700 for providing an augmented reality. Electronic devices 701 may include sensors for collecting data about a user's physical location and pose (position and orientation). In particular, the data may reflect the location and pose of a device 701 itself. The devices 701 may comprise one or more cameras for capturing a real world view of a geographic space. The captured/collected data may be sent to the cloud 703 (e.g., processors of one or more geographically remote servers) for data processing (e.g., frustum determination, application of real world frustum to virtual world, virtual object candidate identification, augmentation selection, augmentation modification, etc.). In addition or as an alternative to a centralized cloud-based system, processors involved in performing steps of processes of the invention may be part of a decentralized system, e.g. an ad hoc system that varies from one embodiment or even one user to the next, at least in terms of the particular hardware providing the computational power for carrying out the described methods. Databases 705 (which may be one database or many) provide permanent or semi-permanent storage and retrieval for network relevant data, virtual world geometric data, other virtual world data, virtual object data, and essentially every other data discussed herein which is not being newly collected from the sensors and cameras which may be deployed in the field. It should be appreciated that the various data types discussed herein which are generally stored in the databases, in particular virtual object data, may be updated over time when new data becomes available or existing data becomes outdated or expired. Virtual objects and augmentations based on those virtual objects may be correspondingly updated. The processors may use an image or video feed from the devices 701 and sensor data, in particular location data, to generate other data. Augmented image data may be sent back to the devices 701 (or other output device as appropriate) which generates the augmented image 706 on its display device.

An "output device", as used herein, may be a device capable of providing at least visual, audio, audiovisual, or tactile output to a user such that the user can perceive the output using his senses (e.g., using her eyes and/or ears). In many embodiments, an output device will comprise at least one display, at least one speaker, or some combination of display(s) and speaker(s). A suitable display (i.e., display device) is a screen of a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally be only the augmentations that are actively shown or output by the device. Visual augmentations are in any case superimposed on the direct view of the real world environment, without necessarily involving the display of any of the original video input to the system. In fact, for systems which do not use the video input to detect image data, the system may include one or more HMDs that have no camera at all, relying entirely on other sensors (e.g. GPS, gyro, compass) to determine the relevant augmentations, and displaying them on otherwise transparent glasses or visors. Output devices and viewing devices may include or be accompanied by input devices (e.g., buttons, touchscreens, menus, keyboards, data ports, etc.) for receiving user inputs.

Figure 8A:
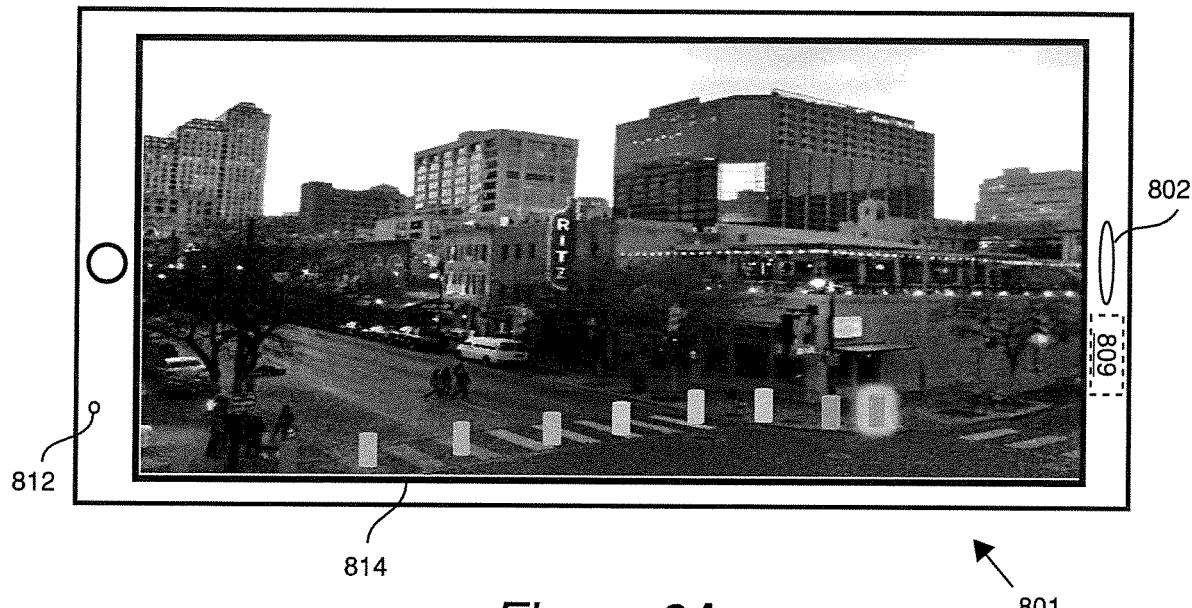
FIGS. 8A and 8B are opposite sides of an exemplary AR-enabled device.
Figure 8B:
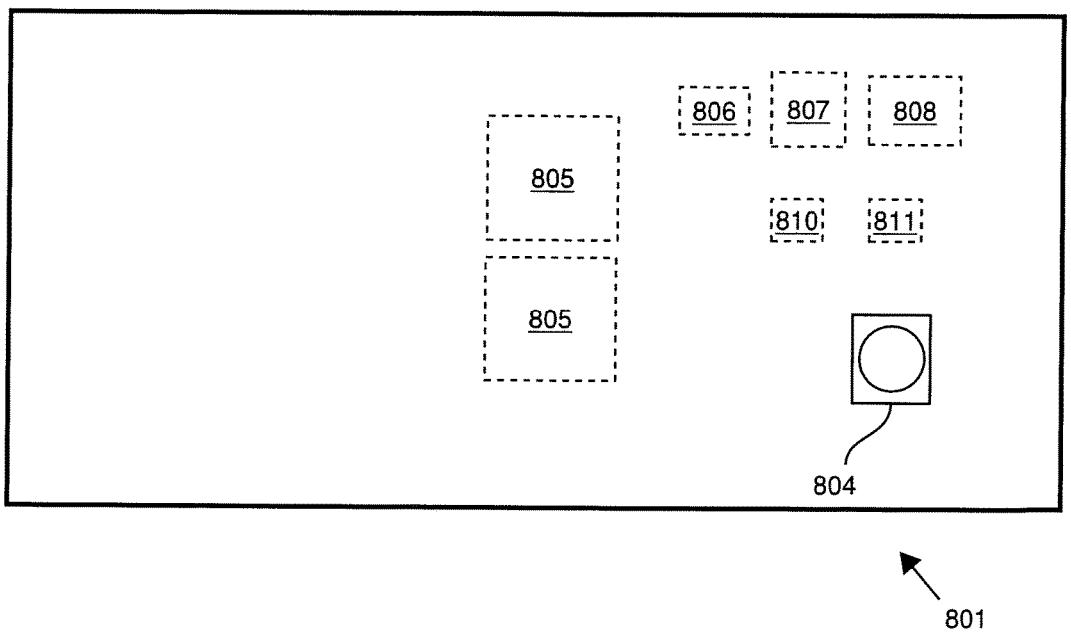

FIGS. 8A and 8B show different views of an electronic device 801 configured for providing an AR output 706 (FIG. 7). FIG. 8A shows an electronic device 801 (e.g., a mobile phone) with a display 814 (e.g., a screen) showing an output according to an example embodiment of the invention. The electronic device 801 includes a speaker 802 as an additional output device besides the display 814. The display 814 and the speaker 802 are both accurately regarded as "output devices", as is the entire electronic device 801 by virtue of the display and speaker being integral therewith. The electronic device 801 comprises or is connected with additional sensors such as an accelerometer 806, gyroscope 807, magnetic field sensor or magnetometer 808, proximity sensor 809, barometer 810, thermometer 811, and microphone 812. The sensors collect the respective data of their respective types (e.g., magnetometer collects magnetic field data or compass data).

An image of a real world view of a geographic space may be captured using one or more cameras. FIG. 8B shows a camera 804 on the rear side of the electronic device 801. As used herein, "camera" may be a device capable of capturing and characterizing incident electromagnetic radiation (i.e., "light") so as to recreate a visual image as a photograph or a series of images forming a film or video. Cameras of some embodiments capture only the visible spectrum (i.e., what humans see naturally). While general consumer cameras concern only the visual spectrum detectable by the unaided human eye, other embodiments of the invention may use one or more cameras which are capable of capturing wavelengths of light which are not visible to unaided human eyes, for instance infrared or ultraviolet light. For the example of FIGS. 8A and 8B, the geographic space that has been imaged is a portion of a street that includes the street itself, crosswalks, and buildings along the street. The image is based on incident light in the visible spectrum. The image (or images) captured by the camera is characterized by data that describes both contents of the image (e.g., colors, pixels, etc.) and aspects of the image's capture. The capture of an image is characterizable with pose (which includes both position and orientation) and field of view.

A real world image or view may include (e.g., if from a city's street intersection camera for instance) HUD displays of date and time, or even could have augmentations in it from another augmented reality system that is providing video to a system based on the present disclosure. Input to one or more processors herein which is described as an image of a real world view may also or alternatively include one or more images which are not of a real world view. In general an augmented reality system need only have some portion of its input that is real. In some embodiments this may be a relatively small portion. Augmented reality systems may be used to modify the augmentations of other augmented reality systems in more complex applications, e.g., a system comprises distributed independent augmentation engines which make use of each other's output.

The data from the camera(s) 804 and collected by the other sensors (e.g., 806, 807, 808, 809, 810, and/or 811) is received by one or more processors 805. The camera data describes an image (or images) of a real world view of the geographic space in the vicinity of the camera and, in some but not all embodiments, in the vicinity of a user. In this example, the camera 804 and the display 814 are part of the same unitary electronic device 801, and the geographic space is also in the vicinity of the output device, display 814. The camera 804 and the electronic device 800 that includes the camera 804 may be regarded as the viewing device. Viewing devices may include various types (but not necessarily all types) of cameras, mobile electronic devices, mobile phones, tablets, portable computers, wearable technology, and the like. If the electronic device 801 were a head-mounted display (HMD), the HMD would be characterizable as a viewing device, too. A HMD that has no cameras, such as some see-through HMDs, may still qualify as a viewing device. A lens or pair of lenses of the see-through head-mounted display also qualifies as a viewing device.

A user may be able to view and benefit from what is shown by an output device, e.g. display 814, in real time. The real world view captured by the camera may be from the viewpoint of a human user as if the user were situated in the space (e.g., sitting, standing, walking, driving, biking, etc.). In many but not all embodiments, the user is situated in the space. A display is but one type of output device usable for providing augmentations. Displays, speakers, and vibratory devices are different examples of output devices usable in embodiments of the invention for providing augmentation outputs to a user detectable with their senses. In some embodiments a viewing device and an output device are the same device or part of the same device. For instance, an HMD may be accurately characterized as both a viewing device and an output device, as may a mobile phone or tablet that has both a camera and a display screen. Alternatively, viewing devices and output devices may be separate devices arranged at completely separate locations. A camera and sensors which are part of a viewing device collecting data about a real world view may be a first location and an output device like a display and/or speaker which provides augmentations with a reproduction of the real world view may be at a second and separate location at some distance apart from the first location.

The one or more processors 805 are configured to process the data from the one or more cameras 804, as well as other data like data from sensors 806, 807, 808, 809, 810, and/or 811, in order to generate an output useable by an output device to present an augmented reality to a user. In some embodiments, the image and/or sensor data from the cameras/sensors is sent over a network 703 (e.g., the Internet) to one or more remote servers comprising some of one or more processors that perform processing of the data before augmentations are provided to an output device for outputting to a user.

Exemplary systems, devices, and methods according to some exemplary embodiments provide augmented reality outputs comprising visual augmentations which collectively describe a path used or useable to traverse a real world landscape. For illustrative purposes, FIGS. 9 to 12 are frames of exemplary augmented reality outputs.

FIG. 9 is a frame of an augmented reality output in which an urban area has been augmented with markers which serve as "breadcrumbs" from a starting location presently off the screen to the left-hand side to a destination location right of center on screen. In this example, the augmentations appear as approximately five or six foot high vertical posts which trace a path that leads across a crosswalk to a sidewalk in front of a restaurant. Besides tracing a clear path for a user to follow, in this case to reach the restaurant, the augmentations may also have various visual qualities which convey additional information. For instance, the sequential augmentations may be color coded to signify how close each respective augmentation is from an end of the path. Augmentations which are furthest from the destination may be colored red, augmentations closer to the destination may be colored orange, augmentations still closer to the destination may be colored yellow, and augmentations nearest to the destination may be colored green, for example.

FIGS. 10 and 11 are separate frames of separate augmented reality outputs in which wooded or park areas have been augmented with trail posts as augmentations. These examples illustrate controlling a size of respective augmentations based on a distance from the AR device. Augmentations which mark trail locations which are nearest to the user are configured to be larger in size as compared with augmentations which mark trail locations which are further away from the user.

FIG. 12 is a frame of an augmented reality output of a dividing bike trail which has been augmented with trail posts. In FIG. 12, the trail markers are color coded to provide directional instructions involving alternative trails. In the viewing frustum is a division in the real world trail, with one real world trail leading left and another real world trail leading right. Based on a preset destination input that is entered into the system (e.g., by the user), the system may select an optimal path among a plurality of stored paths. The alternative paths may be displayed with augmentations simultaneously, and an optimal path coded to signify its preferential treatment. In FIG. 12, for example, the path marker augmentations leading to the left at the split are coded yellow or red, while the path marker augmentations leading to the right are color coded green. Other codings, such as with augmentation shape or size, may be used as an alternative or as an addition to color coding.

Some embodiments of the present invention may be a system, a device, a method, and/or a computer program product. A system, device, or computer program product may include a computer readable storage medium (or media) having computer readable program instructions thereon for causing a processor to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A computer-implemented method of augmented reality (AR), comprising
   associating a plurality of virtual objects with real world locations;
   tracking proximity of a real world target with respect to one or more of the real world locations associated with the plurality of virtual objects;
   changing one or more augmentations of AR content for an AR output based on one or more changes in the proximity of the tracked real world target to the real world locations associated with the plurality of virtual objects; and
   outputting to a user AR content comprising one or more augmentations the presence of which signifies that the tracked real world target has not visited one or more real world locations within some predetermined time period,
   wherein an augmentation changed in the changing step corresponds with one of the plurality of virtual objects.

2. The method of claim 1, further comprising
outputting to a user AR content comprising one or more augmentations which trace a path taken by the real world target.

3. The method of claim 1, wherein the changing step changes an appearance of a given virtual object based on one or more of the following:
whether the real world target visited the real world location associated with the given virtual object;
time elapsed since the real world target visited the real world location associated with the given virtual object;
an amount of time the real world target spent at the real world location associated with the given virtual object;
an identity of the real world target;
whether a user visited the real world location associated with the given virtual object since the real world target visited the real world location associated with the given virtual object;
whether the real world target's view included the real world location associated with the given virtual object; and
a real time distance between the real world location associated with the given virtual object and a real time location of the real world target.

4. The method of claim 1, wherein the real world target is a person, a vehicle, or a mobile electronic device.

5. The method of claim 1, further comprising a step of creating the plurality of virtual objects in a virtual model.

6. A system of augmented reality (AR), comprising
one or more processors configured to execute computer readable program instructions which, when executed, cause the one or more processors to perform
associating a plurality of virtual objects with real world locations;
tracking proximity of a real world target with respect to one or more of the real world locations associated with the plurality of virtual objects;
changing one or more augmentations of AR content for an AR output based on one or more changes in the proximity of the tracked real world target to the real world locations associated with the plurality of virtual objects; and
making a presence of one or more augmentations in the AR output signify that the tracked real world target has not visited one or more real world locations within some predetermined time period,
wherein an augmentation changed in the changing step corresponds with one of the plurality of virtual objects; and
at least one output device for outputting the AR content to a user.

7. The system of claim 6, wherein the one or more processors are caused by the computer readable program instructions to make one or more augmentations of the AR output trace a path taken by the real world target.

8. The system of claim 6, wherein the changing step changes an appearance of a given virtual object based on one or more of the following:
whether the real world target visited the real world location associated with the given virtual object;
time elapsed since the real world target visited the real world location associated with the given virtual object;
an amount of time the real world target spent at the real world location associated with the given virtual object;
an identity of the real world target;
whether a user visited the real world location associated with the given virtual object since the real world target visited the real world location associated with the given virtual object;
whether the real world target's view included the real world location associated with the given virtual object; and
a real time distance between the real world location associated with the given virtual object and a real time location of the real world target.

9. The system of claim 6, wherein the real world target is a person, a vehicle, or a mobile electronic device.

10. The system of claim 6, further comprising a virtual model for containing the plurality of virtual objects.

11. A computer readable program product comprising a non-transitory computer readable medium with computer readable instructions which, when executed by one or more processors, cause the one or more processors to perform
associating a plurality of virtual objects with real world locations;
tracking proximity of a real world target with respect to one or more of the real world locations associated with the plurality of virtual objects;
changing one or more augmentations of AR content for an AR output based on one or more changes in the proximity of the tracked real world target to the real world locations associated with the plurality of virtual objects; and
outputting to a user AR content comprising one or more augmentations, wherein the presence of augmentations signifies that the tracked real world target has not visited one or more real world locations within some predetermined time period,
wherein an augmentation changed in the changing step corresponds with one of the plurality of virtual objects.

12. The computer readable program product of claim 11, further comprising computer readable instructions which cause the one or more processors to perform
outputting to a user AR content comprising one or more augmentations which trace a path taken by the real world target.

13. The computer readable program product of claim 11, wherein the changing step changes an appearance of a given virtual object based on one or more of the following:
whether the real world target visited the real world location associated with the given virtual object;
time elapsed since the real world target visited the real world location associated with the given virtual object;
an amount of time the real world target spent at the real world location associated with the given virtual object;
an identity of the real world target;
whether a user visited the real world location associated with the given virtual object since the real world target visited the real world location associated with the given virtual object;
whether the real world target's view included the real world location associated with the given virtual object; and
a real time distance between the real world location associated with the given virtual object and a real time location of the real world target.

14. The computer readable program product of claim 11, wherein the real world target is a person, a vehicle, or a mobile electronic device.

15. The computer readable program product of claim 11, further comprising computer readable instructions which cause the one or more processors to perform
creating the plurality of virtual objects in a virtual model.

* * * * *